(12) United States Patent
Pan

(10) Patent No.: US 8,688,111 B2
(45) Date of Patent: Apr. 1, 2014

(54) SYSTEM, METHOD, AND DEVICE FOR PROVIDING COMMUNICATIONS USING A DISTRIBUTED MOBILE ARCHITECTURE

(71) Applicant: Lemko Corporation, Itasca, IL (US)

(72) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 0 days.

(21) Appl. No.: 13/718,054

(22) Filed: Dec. 18, 2012

(65) Prior Publication Data

US 2013/0130677 A1 May 23, 2013

Related U.S. Application Data

(60) Continuation of application No. 12/946,012, filed on Nov. 15, 2010, now Pat. No. 8,359,029, which is a division of application No. 11/393,993, filed on Mar. 30, 2006, now Pat. No. 7,856,233.

(51) Int. Cl.
*H04W 4/00* (2009.01)

(52) U.S. Cl.
USPC .................. 455/433; 455/436; 455/435.1

(58) Field of Classification Search
USPC ...................... 455/433, 436, 435.1
See application file for complete search history.

(56) References Cited

U.S. PATENT DOCUMENTS

| 4,284,848 | A | 8/1981 | Frost |
|---|---|---|---|
| 5,590,175 | A | 12/1996 | Gallant et al. |
| 5,623,495 | A | 4/1997 | Eng et al. |
| 5,734,979 | A | 3/1998 | Lu et al. |
| 5,933,784 | A | 8/1999 | Gallagher et al. |
| 5,991,639 | A | 11/1999 | Rautiola et al. |
| 6,122,499 | A | 9/2000 | Magnusson |
| 6,131,038 | A | 10/2000 | Sekine et al. |
| 6,141,564 | A | 10/2000 | Bruner et al. |
| H1918 | H | 11/2000 | Hoffpauir et al. |
| 6,160,804 | A | 12/2000 | Ahmed et al. |
| 6,411,825 | B1 | 6/2002 | Csapo et al. |
| 6,418,308 | B1 | 7/2002 | Heinonen et al. |
| 6,421,325 | B1 | 7/2002 | Kikinis |
| 6,515,985 | B2 | 2/2003 | Shmulevich et al. |

(Continued)

FOREIGN PATENT DOCUMENTS

| CN | 1538781 A | 10/2004 |
|---|---|---|
| CN | 101044769 A | 9/2007 |

(Continued)

OTHER PUBLICATIONS

Yu, W. et al., "Reverse Link Capacity Analysis on Distributed Wireless Communication System", Journal of Beijing University of Posts and Telecommunications, Jun. 30, 2004, 4 pages.

(Continued)

*Primary Examiner* — Kwasi Karikari
(74) *Attorney, Agent, or Firm* — Toler Law Group, PC

(57) ABSTRACT

A method includes receiving, at a first distributed mobile architecture (DMA) system, a call from a first mobile subscriber to a second mobile subscriber and determining whether the second mobile subscriber is registered with one of the first DMA system and a second DMA system based on information stored at an authentication, authorization, and accounting module. The information stored at the AAA module includes a first home location register storing information associated with mobile subscribers registered with the first DMA system and a first community location register storing information associated with a second HLR of the second DMA system.

20 Claims, 23 Drawing Sheets

(56) References Cited

U.S. PATENT DOCUMENTS

| | | |
|---|---|---|
| 6,539,237 B1 | 3/2003 | Sayers et al. |
| 6,542,497 B1 | 4/2003 | Curry et al. |
| 6,549,937 B1 | 4/2003 | Auerbach et al. |
| 6,584,098 B1 | 6/2003 | Dutnall |
| 6,611,533 B1 | 8/2003 | Liao et al. |
| 6,614,784 B1 | 9/2003 | Glitho et al. |
| 6,647,426 B2 | 11/2003 | Mohammed |
| 6,678,155 B1 | 1/2004 | Bresniker |
| 6,694,134 B1 | 2/2004 | Lu et al. |
| 6,697,355 B1 | 2/2004 | Lim |
| 6,704,409 B1 | 3/2004 | Dilip et al. |
| 6,731,932 B1 | 5/2004 | Rune et al. |
| 6,735,184 B1 | 5/2004 | Davidson et al. |
| 6,751,207 B1 | 6/2004 | Lee et al. |
| 6,760,325 B1 | 7/2004 | Hameleers et al. |
| 6,763,226 B1 | 7/2004 | McZeal, Jr. |
| 6,763,233 B2 | 7/2004 | Bharatia |
| 6,791,988 B1 | 9/2004 | Hameleers |
| 6,795,444 B1 | 9/2004 | Vo et al. |
| 6,807,431 B2 | 10/2004 | Sayers et al. |
| 6,807,432 B2 | 10/2004 | Hwang |
| 6,816,706 B1 | 11/2004 | Hohnstein et al. |
| 6,819,652 B1 | 11/2004 | Aravamudhan et al. |
| 6,829,473 B2 | 12/2004 | Raman et al. |
| 6,831,903 B2 | 12/2004 | Kang |
| 6,839,356 B2 | 1/2005 | Barany et al. |
| 6,859,652 B2 | 2/2005 | Karabinis et al. |
| 6,871,072 B1 | 3/2005 | Meche |
| 6,879,582 B1 | 4/2005 | Dhara et al. |
| 6,879,677 B2 | 4/2005 | Trandal et al. |
| 6,917,813 B2 | 7/2005 | Elizondo |
| 6,937,708 B2 | 8/2005 | Hirose |
| 6,958,983 B2 | 10/2005 | Musikka et al. |
| 6,985,454 B1 | 1/2006 | Wiedeman et al. |
| 7,003,286 B2 | 2/2006 | Brown et al. |
| 7,050,414 B2 | 5/2006 | Lin |
| 7,054,307 B2 | 5/2006 | Papadimitriou et al. |
| 7,054,322 B2 | 5/2006 | D'Annunzio et al. |
| 7,072,650 B2 | 7/2006 | Stanforth |
| 7,117,015 B2 | 10/2006 | Scheinert et al. |
| 7,120,435 B2 | 10/2006 | Usher et al. |
| 7,120,436 B2 | 10/2006 | Kim |
| 7,133,670 B1 | 11/2006 | Moll et al. |
| 7,133,923 B2 | 11/2006 | MeLampy et al. |
| 7,136,651 B2 | 11/2006 | Kalavade |
| 7,154,901 B2 | 12/2006 | Chava et al. |
| 7,158,621 B2 | 1/2007 | Bayne |
| 7,171,216 B1 | 1/2007 | Choksi |
| 7,299,039 B2 | 11/2007 | Lee et al. |
| 7,313,399 B2 | 12/2007 | Rhee et al. |
| 7,324,478 B2 | 1/2008 | Park et al. |
| 7,328,268 B1 | 2/2008 | Foltak et al. |
| 7,346,334 B2 | 3/2008 | Gaeta et al. |
| 7,349,412 B1 | 3/2008 | Jones et al. |
| 7,359,700 B2 | 4/2008 | Swensen et al. |
| 7,383,042 B2 | 6/2008 | Lamb et al. |
| 7,385,947 B2 | 6/2008 | Wu et al. |
| 7,406,069 B2 | 7/2008 | Yashar et al. |
| 7,424,313 B2 | 9/2008 | Ham et al. |
| 7,486,967 B2 | 2/2009 | Pan et al. |
| 7,490,132 B1 | 2/2009 | Lyle et al. |
| 7,522,632 B2 | 4/2009 | La Porta et al. |
| 7,536,170 B2 | 5/2009 | Goldman et al. |
| 7,539,158 B2 | 5/2009 | Pan |
| 7,548,763 B2 | 6/2009 | Pan |
| 7,552,670 B2 | 6/2009 | Goldman et al. |
| 7,606,594 B2 | 10/2009 | Jesse et al. |
| 7,653,414 B2 | 1/2010 | Pan |
| 7,738,488 B2 | 6/2010 | Marsico et al. |
| 7,760,695 B2 | 7/2010 | Gopalakrishnan et al. |
| 7,787,879 B1 | 8/2010 | Philips et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,036,158 B2 | 10/2011 | Pan et al. |
| 8,046,420 B2 | 10/2011 | Pan |
| 8,089,920 B2 | 1/2012 | Pan |
| 8,107,409 B2 | 1/2012 | Pan |
| 8,224,322 B2 | 7/2012 | Pan |
| 8,310,990 B2 | 11/2012 | Pan |
| 8,359,029 B2 | 1/2013 | Pan |
| 2001/0013050 A1 | 8/2001 | Shah |
| 2001/0036173 A1 | 11/2001 | Shmulevich et al. |
| 2001/0046859 A1 | 11/2001 | Kil |
| 2001/0055298 A1 | 12/2001 | Baker et al. |
| 2002/0009060 A1 | 1/2002 | Gross |
| 2002/0015392 A1 | 2/2002 | Musikka et al. |
| 2002/0016180 A1 | 2/2002 | Derosier et al. |
| 2010/0048208 A9 | 2/2002 | Gunaratnam et al. |
| 2002/0045444 A1 | 4/2002 | Usher et al. |
| 2002/0051518 A1 | 5/2002 | Bondy et al. |
| 2002/0058502 A1 | 5/2002 | Stanforth |
| 2002/0061746 A1 | 5/2002 | Jo et al. |
| 2002/0160772 A1 | 10/2002 | Gailey et al. |
| 2002/0169887 A1 | 11/2002 | MeLampy et al. |
| 2003/0048766 A1 | 3/2003 | D'Annunzio et al. |
| 2003/0063721 A1 | 4/2003 | Hirose |
| 2003/0088698 A1 | 5/2003 | Singh et al. |
| 2003/0092441 A1 | 5/2003 | Taha et al. |
| 2003/0096628 A1 | 5/2003 | Bar-On et al. |
| 2003/0100302 A1 | 5/2003 | Armbruster et al. |
| 2003/0100342 A1 | 5/2003 | Ham et al. |
| 2003/0112748 A1 | 6/2003 | Puppa et al. |
| 2003/0153343 A1 | 8/2003 | Crockett et al. |
| 2003/0186694 A1 | 10/2003 | Sayers et al. |
| 2003/0198325 A1 | 10/2003 | Bayne |
| 2004/0014466 A1 | 1/2004 | Jesse et al. |
| 2004/0018829 A1 | 1/2004 | Raman et al. |
| 2004/0019539 A1 | 1/2004 | Raman et al. |
| 2004/0156495 A1 | 8/2004 | Chava et al. |
| 2004/0203621 A1 | 10/2004 | Brown et al. |
| 2004/0203677 A1 | 10/2004 | Brown et al. |
| 2004/0204097 A1 | 10/2004 | Scheinert et al. |
| 2004/0253949 A1 | 12/2004 | Swensen et al. |
| 2004/0253984 A1 | 12/2004 | Csapo et al. |
| 2004/0259556 A1 | 12/2004 | Czys |
| 2005/0044152 A1 | 2/2005 | Hardy et al. |
| 2005/0064922 A1 | 3/2005 | Owens et al. |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0176413 A1 | 8/2005 | Lee et al. |
| 2005/0250491 A1 | 11/2005 | Roy et al. |
| 2006/0026252 A1 | 2/2006 | Caspi et al. |
| 2006/0046714 A1 | 3/2006 | Kalavade |
| 2006/0046760 A1 | 3/2006 | Bertino et al. |
| 2006/0047836 A1 | 3/2006 | Rao et al. |
| 2006/0052113 A1 | 3/2006 | Ophir et al. |
| 2006/0063544 A1 | 3/2006 | Zhao et al. |
| 2006/0098661 A1 | 5/2006 | Pan |
| 2006/0114934 A1 | 6/2006 | Shin et al. |
| 2006/0141984 A1 | 6/2006 | Taglienti et al. |
| 2006/0142011 A1 | 6/2006 | Kallio |
| 2006/0148465 A1 | 7/2006 | Perdomo et al. |
| 2006/0159039 A1 | 7/2006 | Jung et al. |
| 2006/0203746 A1 | 9/2006 | Maggenti et al. |
| 2006/0217121 A1 | 9/2006 | Soliman et al. |
| 2006/0221912 A1 | 10/2006 | Olivier et al. |
| 2006/0234747 A1 | 10/2006 | Pan |
| 2006/0234774 A1 | 10/2006 | Pan et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 | 1/2007 | Gaeta et al. |
| 2007/0021118 A1 | 1/2007 | Ophir |
| 2007/0060124 A1 | 3/2007 | Kalavade |
| 2007/0076697 A1 | 4/2007 | Huotari et al. |
| 2007/0087738 A1 | 4/2007 | Melkesetian |
| 2007/0147598 A1 | 6/2007 | Somes et al. |
| 2007/0202847 A1 | 8/2007 | Pan |
| 2007/0213075 A1 | 9/2007 | Jiang |
| 2007/0230352 A1 | 10/2007 | Kokku et al. |
| 2007/0232267 A1 | 10/2007 | Pan |

(56) References Cited

U.S. PATENT DOCUMENTS

| | | | |
|---|---|---|---|
| 2007/0232304 A1 | 10/2007 | Goldman et al. | |
| 2007/0234892 A1 | 10/2007 | Goldman et al. | |
| 2007/0243891 A1 | 10/2007 | Civanlar et al. | |
| 2007/0271606 A1 | 11/2007 | Amann et al. | |
| 2007/0287452 A1 | 12/2007 | Pan | |
| 2007/0291910 A1 | 12/2007 | Bucchieri et al. | |
| 2007/0293216 A1 | 12/2007 | Jiang | |
| 2008/0039144 A1 | 2/2008 | Pan et al. | |
| 2008/0080438 A1 | 4/2008 | Gopalakrishnan et al. | |
| 2008/0101314 A1 | 5/2008 | Bachmutsky | |
| 2008/0101410 A1 | 5/2008 | Barkley et al. | |
| 2008/0134295 A1 | 6/2008 | Bailey et al. | |
| 2008/0146158 A1 | 6/2008 | Pan | |
| 2008/0168523 A1 | 7/2008 | Ansari et al. | |
| 2008/0244014 A1 | 10/2008 | Britton et al. | |
| 2009/0003269 A1 | 1/2009 | Kumazawa et al. | |
| 2009/0022155 A1 | 1/2009 | Rosenberg et al. | |
| 2009/0031244 A1 | 1/2009 | Brezina et al. | |
| 2009/0067441 A1 | 3/2009 | Ansari et al. | |
| 2009/0156213 A1 | 6/2009 | Spinelli et al. | |
| 2009/0186626 A1 | 7/2009 | Raghothaman | |
| 2009/0215449 A1 | 8/2009 | Avner | |
| 2009/0227230 A1 | 9/2009 | Camilleri et al. | |
| 2009/0227235 A1 | 9/2009 | Pan | |
| 2009/0228555 A1 | 9/2009 | Joviak et al. | |
| 2009/0270097 A1 | 10/2009 | Gallagher et al. | |
| 2009/0271491 A1 | 10/2009 | Pan | |
| 2009/0292785 A1 | 11/2009 | Leedberg et al. | |
| 2009/0325584 A1 | 12/2009 | Pan | |
| 2009/0327819 A1 | 12/2009 | Pan | |
| 2010/0008306 A1 | 1/2010 | Pan | |
| 2010/0008369 A1 | 1/2010 | Pan | |
| 2010/0048197 A1 | 2/2010 | Jiang | |
| 2010/0057485 A1 | 3/2010 | Luft | |
| 2010/0057732 A1 | 3/2010 | O'Sullivan et al. | |
| 2010/0075668 A1 | 3/2010 | Pan | |
| 2010/0080214 A1 | 4/2010 | Li et al. | |
| 2010/0094878 A1 | 4/2010 | Soroca et al. | |
| 2010/0199340 A1 | 8/2010 | Jonas et al. | |
| 2010/0217809 A1 | 8/2010 | Vymenets et al. | |
| 2010/0217837 A1 | 8/2010 | Ansari et al. | |
| 2011/0059740 A1 | 3/2011 | Pan | |
| 2011/0060853 A1 | 3/2011 | Pan | |
| 2011/0223921 A1 | 9/2011 | Pan | |
| 2012/0002607 A1 | 1/2012 | Pan | |
| 2012/0020293 A1 | 1/2012 | Nix, Jr. et al. | |
| 2012/0044908 A1 | 2/2012 | Spinelli et al. | |
| 2012/0094659 A1 | 4/2012 | Pan | |
| 2012/0106454 A1 | 5/2012 | Pan | |
| 2012/0252444 A1 | 10/2012 | Pan | |
| 2013/0039279 A1 | 2/2013 | Pan | |
| 2013/0065583 A1 | 3/2013 | Pan | |
| 2013/0148578 A1 | 6/2013 | Pan | |

FOREIGN PATENT DOCUMENTS

| | | |
|---|---|---|
| EP | 0365885 | 5/1990 |
| GB | 2435751 B | 2/2009 |
| WO | 2006052342 A2 | 5/2006 |
| WO | 2007102003 A1 | 9/2007 |
| WO | 2008150281 A1 | 12/2008 |
| WO | 2009158154 A2 | 12/2009 |
| WO | 2009158155 A2 | 12/2009 |
| WO | 2010005648 A2 | 1/2010 |
| WO | 2010008695 A2 | 1/2010 |
| WO | 2010036439 A2 | 4/2010 |

OTHER PUBLICATIONS

Hoffpauir et al., United States Statutory Invention Registration No. H1,918; Entitled "Integrated Authentication Center and Method for Authentication in a Wireless Telecommunications Network"; filed Feb. 19, 1998; Published Nov. 7, 2000; 19 Pages.

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "SPAWN: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chul Park (Network Research Laboratory ETRI Korea) Jong-Ok Lee and Yoon-Hak Bang (Network Planning Team KT Korea); "Architecture to be Deployed on Strategies of Next-Generation Networks"; 0-7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vögel (the Fantastic Corp); "(Auto) Mobile communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center) "Peer-to-peer SIP-based Services over Wireless Ad Hoc Networks"; BRODWIM: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A Communication Gateway for Infrastructure Independent Wireless Access"; IEEE Communications Magazine; Mar. 2002; vol. 9; No. 3; 6 pages.

Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.

Ralf Pabst, Bernard H. Welke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghavami (Kings College); "Relay-Based Deployment Concepts for Wireless and Mobile Broadband Radio"; 0163-6804/04; 2004 IEEE; IEEE Communications Magazine; Sep. 2004; pp. 80-89.

Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.

Ian F. Akyildiz (Broadband and Wireless Networking BWN Lab, Georgia Institute of Technology) Xudong Wang & Weilin Wang (Kiyon, Inc. La Jolla, CA); "Wireless Mesh Networks: A Survey"; Computer Networks 47; Jan. 1, 2005; pp. 445-487; 1389-1286 2004 Elsevier B.V.

Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Col-

(56) References Cited

OTHER PUBLICATIONS laborative Enterprises (WETICE 2001); Jun. 20-22, 2001; Cambridge, MA, USA; IEEE Computer Society 2001; ISBN 0-7695-1269-0; 2 pages.
"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.
Non-Final Office Action for U.S. Appl. No. 12/946,012 mailed May 8, 2012, 31 pages.
Notice of Allowance and Fee(s) Due for U.S. Appl. No. 12/946,012 mailed Sep. 19, 2012, 14 pages.
Requirement for Restriction/Election for U.S. Appl. No. 11/393,993 mailed Nov. 13, 2008, 5 pages.
Non-Final Office Action for U.S. Appl. No. 11/393,993 mailed Apr. 6, 2009, 18 pages.
Final Office Action for U.S. Appl. No. 11/393,993 mailed Nov. 12, 2009, 20 pages.
Notice of Allowance and Fee(s) Due for U.S. Appl. No. 11/393,993 mailed Sep. 2, 2010, 7 pages.

| | | 510 | 512 | 514 | 516 | 518 | 520 | 522 | 524 | 526 | 528 | 530 |
|---|---|---|---|---|---|---|---|---|---|---|---|---|
| | DMA1 | IMSI | ESN | MDN | Loc | TLDN | Reg? | Timer | MSC1 Prefer | ISDN Prefer | VoIP Prefer | |
| 502 | HLR IP Addr GPS Loc | IMSI11 IMSI12 IMSI13 IMSI14 | ESN11 ESN12 ESN13 ESN14 | MDN11 MDN12 MDN13 MDN14 | @IP @IP | TLDN NA NA NA | y y y n | 4hr 4hr 4hr | @PC | | | |
| 504 | CLR2 IP Addr GPS Loc NB List | IMSI21 IMSI22 IMSI23 IMSI24 | ESN21 ESN22 ESN23 ESN24 | MDN21 MDN22 MDN23 MDN24 | NA NA NA NA | NA NA NA NA | | | | | | |
| 506 | CLR3 IP Addr GPS Loc NB List | IMSI31 IMSI32 IMSI33 IMSI34 | MDN31 MDN32 MDN33 MDN34 | NA NA NA NA | NA NA NA NA | | | | | | | |
| 508 | VLR | IMSIa IMSIb IMSIc | ESNa ESNb ESNc | NA NA NA | NA NA NA | TLDNa TLDNb TLDNc | y y y | 4hr 4hr 4hr | @PC @PC @PC | | | |

FIG. 5

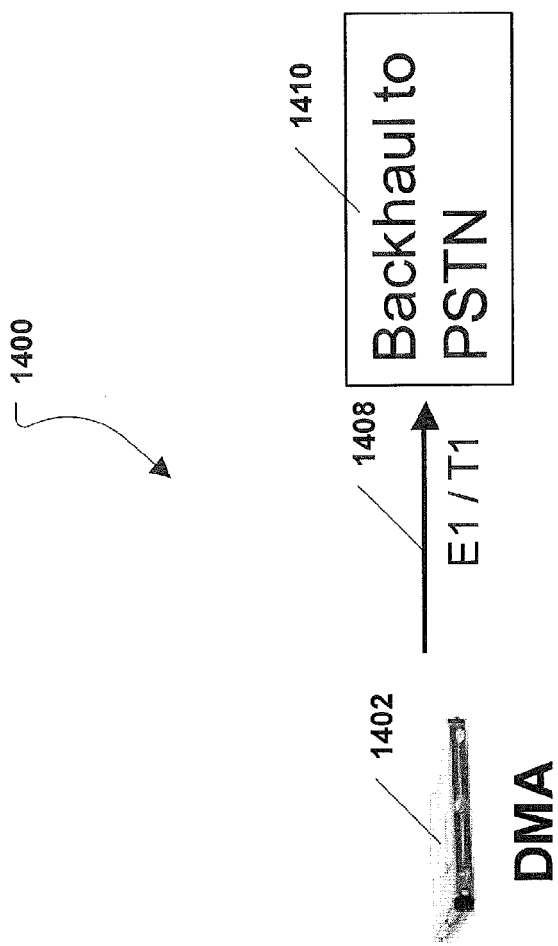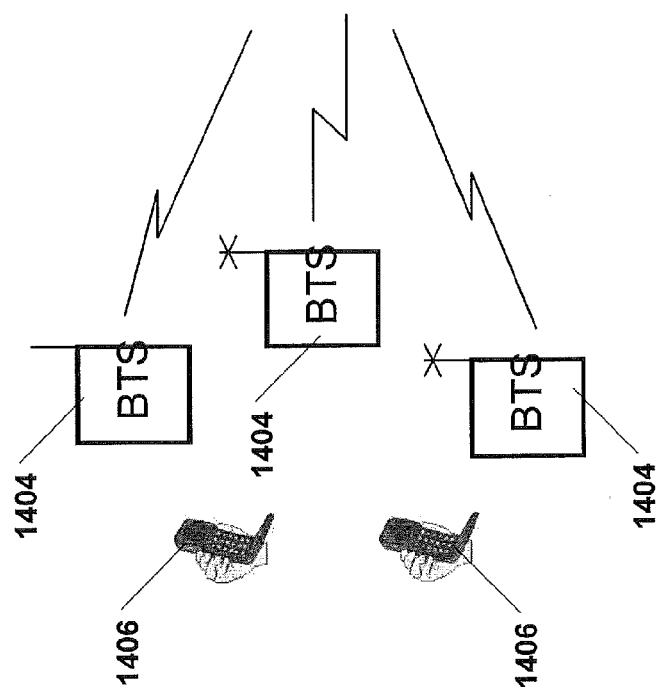
FIG. 14

SYSTEM, METHOD, AND DEVICE FOR PROVIDING COMMUNICATIONS USING A DISTRIBUTED MOBILE ARCHITECTURE

CLAIM OF PRIORITY

The present application claims priority from and is a continuation of U.S. patent application Ser. No. 12/946,012, issued as U.S. Pat. No. 8,359,029, filed on Nov. 15, 2010 and entitled "SYSTEM, METHOD, AND DEVICE FOR PROVIDING COMMUNICATIONS USING A DISTRIBUTED MOBILE ARCHITECTURE," which claims priority from and is a divisional application of U.S. Pat. No. 7,856,233 filed on Mar. 30, 2006 and entitled "SYSTEM, METHOD, AND DEVICE FOR PROVIDING COMMUNICATIONS USING A DISTRIBUTED MOBILE ARCHITECTURE," the contents of each of which are expressly incorporated herein by reference in their entirety.

FIELD OF THE DISCLOSURE

The present disclosure relates generally to mobile communication systems.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to one. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than four to one.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system may require a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally prohibitive. An alternative to such a cellular system can include a wired system, but the costs associated with deploying and maintaining land lines are too high for certain rural areas.

Accordingly, there exists a need for an improved communications system that is relatively inexpensive to deploy and relatively inexpensive to operate.

BRIEF DESCRIPTION OF THE DRAWINGS

The present invention is pointed out with particularity in the appended claims. However, other features are described in the following detailed description in conjunction with the accompanying drawings in which:

FIG. 5 is a diagram of an exemplary data structure for use by an authentication, authorization, and accounting module of a distributed mobile architecture;

FIG. 14 is a diagram of a communication system in which a single distributed management architecture server can be connected to plural base transceiver stations and can provide a single backhaul to the public switched telephone network;

DETAILED DESCRIPTION

Figure 1:
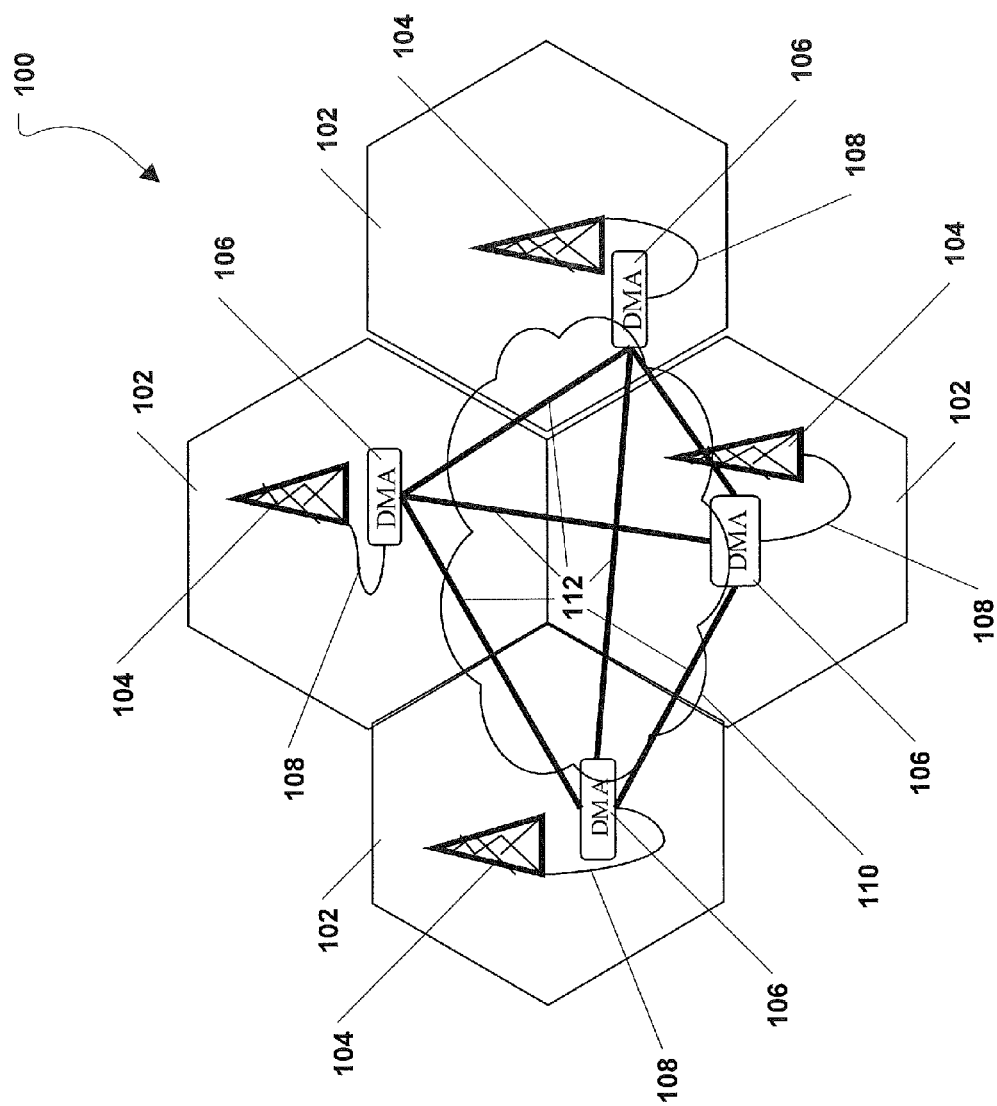
FIG. 1 is a diagram of a distributed and associative communication system.

In a particular embodiment, a non-transitory computer readable storage medium of a first distributed management architecture (DMA) system includes a first home location register (HLR) that stores information associated with one or more mobile subscribers that are registered with the first DMA system. The non-transitory computer readable storage medium includes a community location register (CLR) associated with a second DMA system. The CLR stores information associated with a second HLR of the second DMA system, and the second HLR stores information associated with one or more mobile subscribers that are registered with the second DMA system. The non-transitory computer readable storage medium includes instructions that, when executed by a processor, cause the processor to initiate connection of a call from a first mobile subscriber to a second mobile subscriber via the first DMA system and the second DMA system when the second mobile subscriber is registered with the second DMA system.

In another particular embodiment, a non-transitory computer readable storage medium comprises instructions that are executable by a processor. A call is received from a first mobile subscriber that is directed to a second mobile subscriber. The call is received at a first DMA system of a DMA network that includes at least the first DMA system and a second DMA system. The instructions cause the processor to determine whether the second mobile subscriber is registered with the first DMA system based on information stored at a first HLR of the first DMA system. The first HLR includes information associated with one or more mobile subscribers that are registered with the first DMA system. When the second mobile subscriber is not registered with the first DMA system the instructions cause the processor to determine whether the second mobile subscriber is registered with the second DMA system based on information stored at a second CLR associated with the second DMA system. The second CLR is stored at the first DMA system and includes information associated with a second HLR of the second DMA system. The second HLR includes information associated with one or more mobile subscribers that are registered with the second DMA system.

In another particular embodiment, a method includes receiving registration information associated with a mobile subscriber at a second DMA system of a DMA network. The registration information is received while the mobile subscriber is located within a coverage area associated with a third DMA system of the DMA network. A location update request is received at the second DMA system, where the location update request is related to the mobile subscriber and is sent from a first DMA system of the DMA network. The method includes sending a second location update request from the second DMA system to the third DMA system in response to receiving the location update request from the first DMA system. A destination IP address associated with the mobile subscriber is received from the third DMA system, and the destination IP address associated with the mobile subscriber is sent to the first DMA system. A call may be connected from the first DMA system to the third DMA system via a peer-to-peer IP connection based on a source IP address associated with the first DMA system and the destination IP address associated with the mobile subscriber An authentication, authorization, and accounting module of a first distributed mobile architecture includes a home location register. The home location register provides information associated with one or more mobile subscribers that are registered with the first distributed mobile architecture. Also, the information within the home location register at the first distributed mobile architecture is also provided at a first community location register at a second distributed mobile architecture that is accessible to the first distributed mobile architecture. The module further includes a second community location register that includes information associated with one or more mobile subscribers registered with the second distributed mobile architecture.

In a particular embodiment, the module also includes a third community location register that includes information associated with one or more mobile subscribers registered with a third distributed mobile architecture. In another particular embodiment, the first home location register includes information associated with one or more mobile subscribers that are registered with the first distributed mobile architecture.

In yet another particular embodiment, the module further includes a visitor location register that includes information associated with one or more roaming mobile subscribers that are temporarily registered with the first distributed mobile architecture. In still another particular embodiment, the home location register includes an international mobile subscriber identification (IMSI), an electronic series number (ESN), a mobile directory number (MDN), a location indicator, a temporary location directory number (TLDN), a registration indicator, a timer, a mobile switching center (MSC) preference indicator, an integrated services digital network (ISDN) preference indicator; and a voice over Internet protocol (VoIP) preference indicator.

Additionally, in a particular embodiment, the community location register includes an international mobile subscriber identification (IMSI), an electronic series number (ESN), and a mobile directory number (MDN). Also, the visitor location register includes an international mobile subscriber identification (IMSI), an electronic series number (ESN), a temporary location directory number (TLDN), a registration indicator, a timer, a mobile switching center (MSC) preference indicator, an integrated services digital network (ISDN) preference indicator, and a voice over Internet protocol (VoIP) preference indicator.

In another embodiment, a method of communication includes registering a first mobile subscriber within a home location register of a distributed mobile architecture and registering a second mobile subscriber within the home location register. Further, the method includes receiving a call from the first mobile subscriber to a second mobile subscriber, locating data associated with the first mobile subscriber within the home location register, locating data associated the second mobile subscriber within the home location register, and connecting the call between the first mobile subscriber and the second mobile subscriber via the distributed mobile architecture.

In yet another embodiment, a method of establishing communication via a distributed mobile architecture network includes receiving a call from a first mobile subscriber to a second mobile architecture and locating data that is associated with the second mobile subscriber within a community location register at the first distributed mobile architecture. The community location register can include information that is associated with one or more mobile subscribers registered with the second distributed mobile architecture.

In still another embodiment, a method of establishing a call between a first mobile subscriber and a second mobile subscriber includes receiving a location update request relating to the second mobile subscriber at a second distributed mobile architecture. In this embodiment, the location update request is sent from a first distributed mobile architecture.

In yet still another embodiment, a distributed mobile architecture includes a processor, a computer readable medium that is accessible to the processor, and an authentication, authorization, and accounting module that is embedded within the computer readable medium. In this embodiment, the authentication, authorization, and accounting module includes a home location register that includes information associated with one or more mobile subscribers that are registered with the distributed mobile architecture. Further, the authentication, authorization, and accounting module includes a community location register that includes information associated with a home location register of another distributed mobile architecture.

In another embodiment, a system includes a first distributed mobile architecture, a second distributed mobile architecture that is coupled to the first distributed mobile architecture via an Internet protocol network, and a third distributed mobile architecture that is coupled to the first distributed mobile architecture and the second distributed mobile architecture via the Internet protocol network. In this embodiment, the first distributed mobile architecture includes a home location register, a second community location register that is associated with the second distributed mobile architecture, and a third community location register that is associated with the third distributed mobile architecture.

Referring to FIG. 1, a non-limiting, exemplary embodiment of a distributed and associative telecommunications system is illustrated and is generally designated 100. As depicted in FIG. 1, the system 100 includes four cellular coverage sites 102. Each coverage site 102 includes an antenna 104. In one embodiment, the antenna 104 is connected to a transceiver belonging to a base transceiver station (BTS) and the BTS is a 3-sector BTS. FIG. 1 also indicates that a distributed mobile architecture (DMA) 106 can be connected to each antenna 104. In one embodiment, each DMA 106 is physically and directly connected to its respective antenna 104, e.g., by a wire or cable 108. Further, in an illustrative embodiment, each DMA 106 can include the components described herein in conjunction with FIG. 3.

As illustrated in FIG. 1, each DMA 106 is interconnected with the other DMAs 106 via an Internet protocol network 110. As such, there exists a peer-to-peer connection 112 between each DMA 106 in the system 100. The DMAs 106 can handle telephony traffic that is communicated at each antenna 104. For example, the DMAs 106 can switch and route calls received via each antenna 104. Additionally, the DMAs 106 can hand-off calls to each other as mobile communication devices move around and between the cellular coverage sites 102. The DMAs 106 can communicate with each other via the IP network 110 and can further transmit calls to each other via the IP network 110. It should be understood that more than four cellular coverage sites 102 can be included in the system and that the inclusion of only four cellular coverage sites 102 in FIG. 1 is merely for clarity and explanation purposes.

Within the distributed and associative communications system 100, the controlling logic can be distributed and de-centralized. Moreover, the wireless coverage provided by the disclosed system 100 is self-healing and redundant. In other words, due to the interconnectivity via the IP network 110, if one or more of the DMAs 106 loses power, fails, or is otherwise inoperable, telephony traffic handled by the inoperable DMA 106 can re-routed to one of the remaining operable DMAs 106. Additionally, user data stored in a database, e.g., a home locator resource (HLR) or a visitor locator resource (VLR), can be distributed equally and fully among all of the DMAs 106. It can also be appreciated that new cellular coverage sites can be easily added to the system 100 as the demand for users increases. Specifically, a DMA can be deployed, connected to an antenna, connected to the IP network, and activated to provided cellular coverage in a new area.

Figure 2:
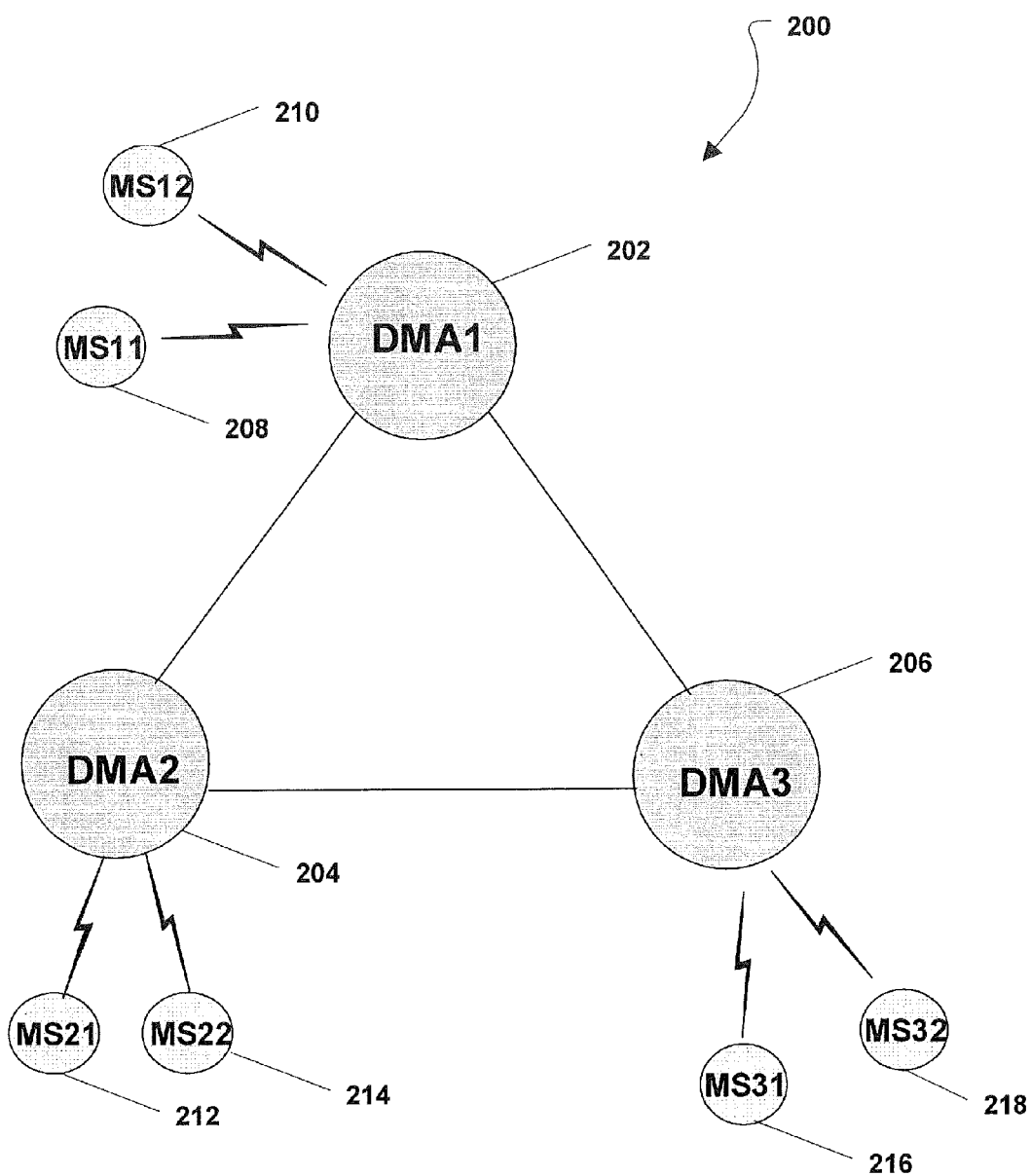
FIG. 2 is a diagram of a network including a plurality of distributed mobile architectures.

FIG. 2 shows an exemplary, non-limiting embodiment of a network system, generally designated 200, that includes a plurality of DMAs. As illustrated in FIG. 2, the system 200 can include an Internet protocol (IP) peer-to-peer network that includes a first distributed mobile architecture 202 that is coupled to a second distributed mobile architecture 204 and to a third distributed mobile architecture 206. Further, the second distributed mobile architecture 204 is coupled to the third distributed mobile architecture 206.

As shown in FIG. 2, a first mobile subscriber 208 and a second mobile subscriber 210 are wirelessly coupled to the first distributed mobile architecture 202. A first mobile subscriber 212 and a second mobile subscriber 214 are wirelessly coupled to the second distributed mobile architecture 204. Additionally, a first mobile subscriber 216 and a second mobile subscriber 218 are wirelessly coupled to the third distributed mobile architecture 206.

In a particular embodiment, as described in detail herein, a mobile subscriber can communicate with another mobile subscriber via the first distributed mobile architecture 202, the second distributed mobile architecture 204, or the third distributed mobile architecture 206. Further, in a particular embodiment, a mobile subscriber can communicate with another mobile subscriber via the first distributed mobile architecture 202 and the second distributed mobile architecture 204, the first distributed mobile architecture 202 and the third distributed mobile architecture 206, and the second distributed mobile architecture 204 and the third distributed mobile architecture 206. Additionally, in a particular embodiment, a mobile subscriber can communicate with another mobile subscriber via the first distributed mobile architecture 202, the second distributed mobile architecture 204, or the third distributed mobile architecture 206.

Further, in a particular embodiment, the first mobile subscriber 210 of the first DMA 202 can be connected locally to the second mobile subscriber 210 of the first DMA 202 after locating the second mobile subscriber 210 within the a home location register (HLR) within the first DMA 202. Additionally, the first or second mobile subscriber 210, 212 of the first DMA 202 can be connected to the first or second mobile subscriber 212, 214 of the second DMA 204 after locating the first or second mobile subscriber 212, 214 of the second DMA 204 within a second community location register (CLR) associated with the second DMA 202 that is stored within the first DMA 202. Moreover, the first or second mobile subscriber 210, 212 of the first DMA 202 can be connected to the first or second mobile subscriber 216, 218 of the third DMA 206 after locating the first or second mobile subscriber 216, 218 of the third DMA 206 within a third community location register (CLR) associated with the third DMA 206 that is stored within the first DMA 202.

As a mobile subscriber roams into a coverage area that is not provided by the DMA to which the mobile subscriber is registered, the mobile subscriber can be temporarily registered with a new DMA while the mobile subscriber is roaming. CLR information concerning the roaming mobile subscriber can be obtained from the new DMA in order to complete a call to the roaming mobile subscriber.

Figure 3:
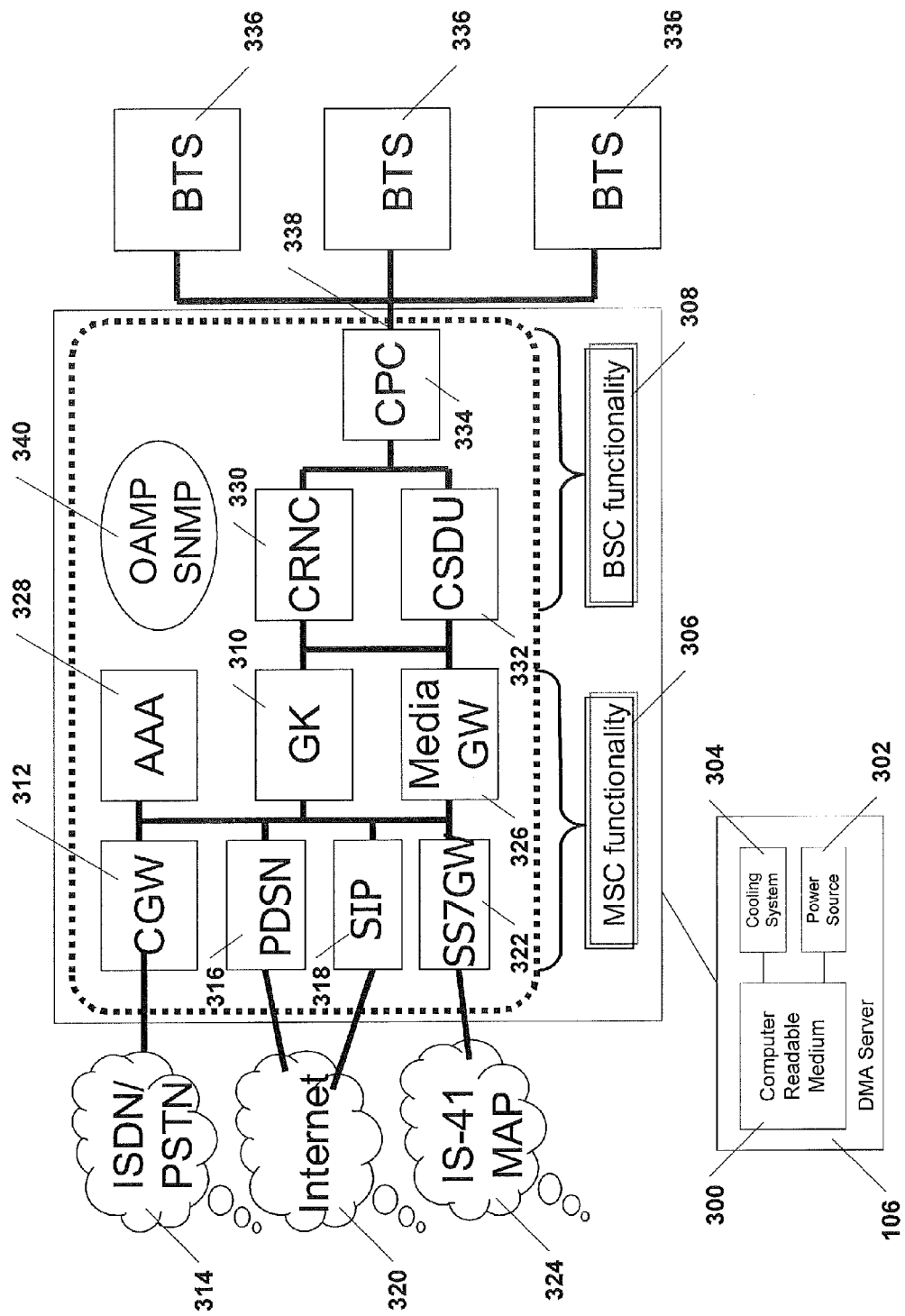
FIG. 3 is a block diagram of a distributed management architecture server.

FIG. 3 shows an exemplary, non-limiting, embodiment of a DMA, e.g., one of the DMAs 106 described in conjunction with FIG. 1 or one of the DMAs 202, 204, 206 shown in FIG. 2. In a particular embodiment, the DMA 106 includes a processor, or computer, having a housing and a computer readable medium 300 that is disposed therein. A power supply 302 can also be disposed within the housing of the DMA 106 in order to provide power to the DMA 106. The power supply 302 can be a rechargeable battery disposed within the DMA 106 or it can be external to the DMA 106, i.e., a standard power outlet. Moreover, a cooling system 304, e.g., a fan with a thermostat, can be within the DMA 106 in order to keep the DMA 106 from overheating. In an alternative embodiment, the DMA 106 can be a single board processor that does not require a fan.

As depicted in FIG. 3, the DMA 106 can include a mobile switching center (MSC) module 306 and a base station controller (BSC) module 308 embedded within the computer readable medium 300. In an exemplary, non-limiting embodiment, the MSC module 306 can include a gatekeeper (GK) 310 that is connected to several gateways. For example, a circuit gateway (CGW) 312 can be connected to the GK 310 and can provide connectivity to an integrated services digital network/public switched telephone network (ISDN/PSTN) interface 314. The CGW 312 can provide a circuit switched to packet data conversion. In an exemplary, non-limiting embodiment, the PSTN portion of the ISDN/PSTN interface 314 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 314.

As further illustrated in FIG. 3, a packet data service node (PDSN) gateway 316 for CDMA, or a Gateway GPRS Support Node (GGSN) for Global System for Mobile Communication (GSM), and a Session Initiation Protocol (SIP) gateway 318 can also be connected to the GK 310. The PDSN gateway 316 and the SIP gateway 318 can provide connectivity to an Internet protocol (IP) interface 320. Further, the PDSN gateway 316 or a GGSN can establish a reverse tunnel with the PDSN or GGSN gateway 316 using generic routing encapsulation (GRE). Moreover, the PDSN gateway 316, or GGSN, can implement the Pseudo Random Function (PRF)/Foreign Agent (FA) functionality of the DMA 106 which supports mobile IP functions.

FIG. 3 further shows an SS7 gateway 322 that provides connectivity to an ANSI-41 and GSM Mobile Application Part (MAP) interface 324. In a particular embodiment, the ANSI-41 interface can be an SS7 TCAP/SCCP interface on the same SS7 link set used for ISUP signaling The same SS7 point code can be used to identify the DMA 106 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 3, a media gateway 326 can also be coupled to the GK 310. In an exemplary, non-limiting embodiment, the media gateway 326 can include cellular transcoders, one or more intranet gateways, conferencing bridges, and group calling functionality. Further, an authentication, authorization, and accounting (AAA) module 328 can be coupled to the GK 310. In an exemplary, non-limiting embodiment, there are three levels of authentication management. The highest level is for administration, the mid-level is for operations, and the lowest level is for normal users. The functions of the AAA module 328 can be included in the user level.

In an exemplary, non-limiting embodiment, the GK 310 can act as an AAA server and a feather server to support advanced supplementary service, short message service, etc. Moreover, the GK 310 can act as a call manager and can support ISUP and PSTN function calls. Additionally, the GK 310 can act as a signal gateway, e.g., IP to SS7 inter-working, ISUP, GSM MAP or ANSI-41 to PSTN and ANSI-42/GSM. The GK 310 can also function as a data call server.

As illustrated in FIG. 3, the BSC module 308 includes a cellular radio network controller (CRNC) 330 and a cellular selection/distribution unit (CSDU) 332 that are connected to a call protocol controller (CPC) 334. In turn, the CPC 334 can be connected to a plurality of base transceiver stations (BTSs) 336. Specifically, the DMA 106 includes a BTS interface 338 at the CPC 334 that can be physically and directly connected to the BTSs 336. The CRNC 330 can provide cellular radio resource management and cellular call control. The CSDU 332 can provide Fundamental Channel (FCH) soft handoff and distribution, Link Access Control (LAC) processing for inband signaling, multiplexer (MUX) functions, and centralized power control. Further, the CPC 334 can convert a T1 or E1 message or ATM interface to a data packet message. In a particular embodiment, each BTS 336 supports signals and traffic up to the front point of the CPC 334, e.g., up to the BTS interface 338. Further, in a particular embodiment, the CRNC 330, the CPC 334, the CSDU 332 and the OAMP 340 can perform one or more of the functions of legacy Base Station Controllers (BSC).

In an exemplary, non-limiting embodiment, the BTS interface 338 can be an IS-95A OR IS-2000 interface over E1 or ATM, or the BTS interface 338 can be a GSM BTS, e.g., an Abis interface. Further, the BTS interface 338 can be a universal mobile telecommunications system (UMTS) Tub interface or customized application for mobile network enhanced logic (CAMEL). In an illustrative embodiment, the CPC 334 can be connected to one or more BTSs 336. FIG. 3 further shows that the BSC module 308 includes an operations, administration, maintenance, and provisioning (OAMP) module 340. In an exemplary, non-limiting embodiment, the OAMP module 340 can use simple network management protocol (SNMP) for operations interfaces. Further, the OAMP module 340 can include a JAVA user interface. The OAMP module 340 can also include a software agent that is assigned to each component within the DMA 106. The agents independently monitor their respective components. Moreover, each agent can provision its respective component.

In a particular embodiment, a DMA can be implemented as a system or a device. For example, a DMA system or a DMA device can include a DMA server or an DMA on board processor.

Figure 4:
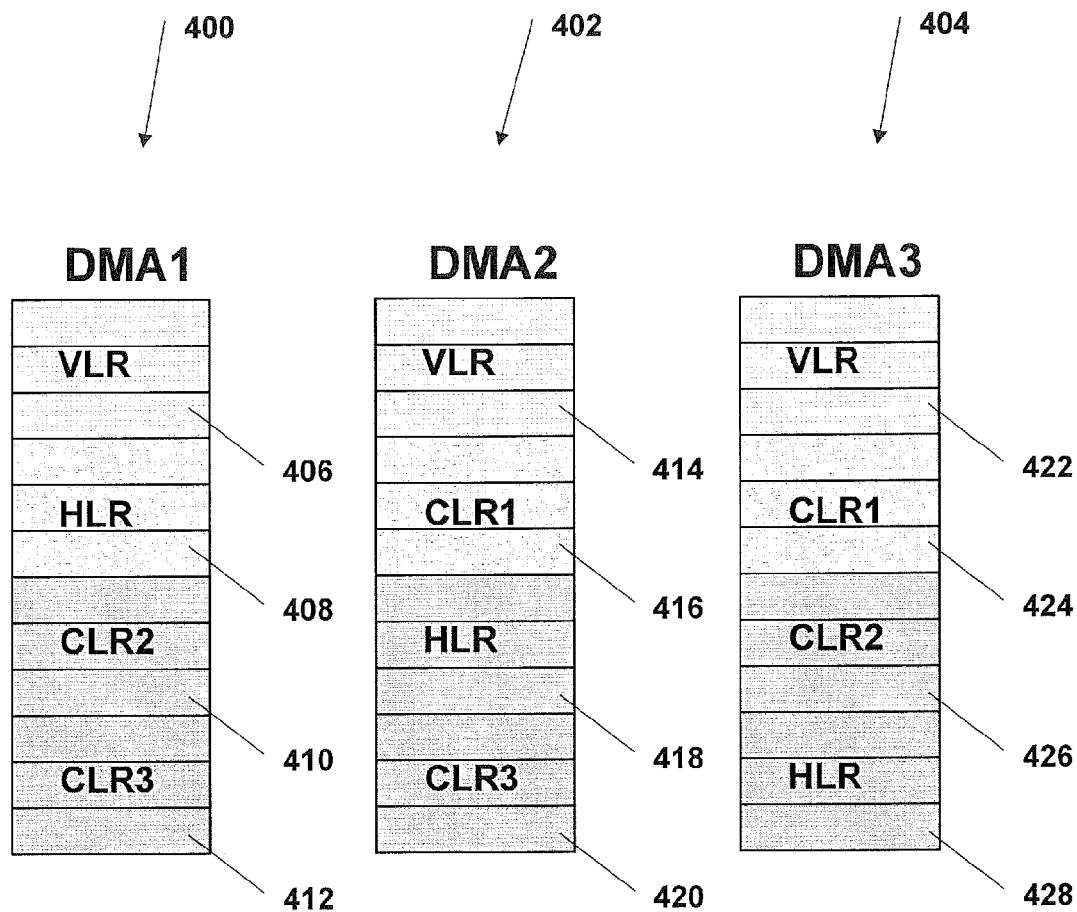
FIG. 4 is a diagram of a plurality of distributed mobile architectures.

FIG. 4 depicts a plurality of DMAs. Particularly, FIG. 4 depicts a first DMA 400, a second DMA 402, and a third DMA 404. FIG. 4 indicates that, in general, each DMA 400 includes a visitor location register (VLR), a home location register (HLR), and at least one community location register (CLR). In a particular embodiment, the VLR, HLR, and the CLR within each DMA 400, 402, 404 are part of an AAA module within each DMA 400, 402, 404. For example, the HLR, VLR, and CLR may be within the AAA module 328 of the exemplary DMA of FIG. 3.

In a particular embodiment, as indicated in FIG. 4, the first DMA 400 includes a VLR 406, an HLR 408, a second CLR 410, and a third CLR 412. Further, the second DMA 402 includes a VLR 414, a first CLR 416, an HLR 418, and a third CLR 420. Additionally, the third DMA 404 includes a VLR 422, a first CLR 424, a second CLR 426, and an HLR 428.

In an exemplary, non-limiting embodiment, the first CLR 416 within the second DMA 402 and the first CLR 424 within the third DMA 404 correspond to the HLR 408 of the first DMA 400. More particularly, the first CLR 416 within the second DMA 402 and the first CLR 424 within the third DMA 404 include information that is stored within the HLR 408 of the first DMA server 400. In a particular embodiment, that information can include mobile location information associated with the first DMA server 400, e.g., a mobile location of the first DMA server 400.

Additionally, in an exemplary, non-limiting embodiment, the second CLR 410 within the first DMA 400 and the second CLR 426 within the third DMA 404 correspond to the HLR 418 of the second DMA 402. More particularly, the second CLR 410 within the first DMA 400 and the second CLR 426 within the third DMA 404 include the information that is stored within the HLR 418 of the second DMA server 402. In a particular embodiment, that information can include mobile location information associated with the second DMA server 402, e.g., a mobile location of the first DMA server 402.

Also, in an exemplary, non-limiting embodiment, the third CLR 412 within the first DMA 400 and the third CLR 420 within the second DMA 402 correspond to the HLR 428 of the third DMA 404. More particularly, the third CLR 412 within the first DMA 400 and the third CLR 420 within the second DMA 402 include the information that is stored within the HLR 428 of the third DMA server 404. In a particular embodiment, that information can include mobile location information associated with the third DMA server 404, e.g., a mobile location of the third DMA server 404.

Referring to FIG. 5, an exemplary, non-limiting embodiment of an authentication, authorization, and accounting (AAA) module is shown and is generally designated 500. The AAA module depicted in FIG. 5 can be embedded within any of the DMAs that are described herein. As indicated in FIG. 5, the AAA module 500 includes data associated with an HLR 502, a second CLR 504, a third CLR 506, and a VLR 508. As shown, the HLR 502 data includes a plurality of IP addresses that can be used to establish one or more telephone calls within a first DMA in which the AAA module 500 is embedded. The HLR 502 data further includes a global positioning system (GPS) location of the first DMA in which the AAA 500 is embedded.

As illustrated in FIG. 5, the second CLR 504 and the third CLR 506 include one or more IP addresses that can be used to establish one or more telephone calls via a second and third DMA that are coupled to the first DMA in which the AAA module 500 is embedded. The second CLR 504 and the third CLR 506 also include a GPS location for the second and third DMA that are coupled to the first DMA in which the AAA module 500 is embedded. In lieu of a GPS location, a GSM location may be provided. Further, the second CLR 502 and the third CLR 504 include a neighborhood (NB) list to identify neighboring DMS that are located proximately to the DMA in which the AAA module 500 is embedded. In a particular embodiment, each DMA can be identified by an assigned DMA identification. The DMA identification for each DMA can be stored within the CLR associated with each DMA.

FIG. 5 further indicates the data associated with the HLR 502, the second CLR 504, the third CLR 506, and the VLR 508 include at least one international mobile subscriber identification (IMSI) 512 and at least one electronic series number (ESN) 514. Moreover, the HLR 502, the second CLR 504, and the third CLR 506 records also include at least one mobile directory number (MDN) 516. In a particular embodiment, the HLR 502 includes a location 518 for at least one mobile subscriber that is registered with the HLR 502.

As shown in FIG. 5, the VLR 508 further include at least one temporary location directory number (TLDN) 520, a registration indicator 522, a timer 524, a mobile switching center (MSC) preference indicator 526, an integrated services digital network (ISDN) preference indicator 528, and a voice over Internet protocol (VoIP) preference indicator 530. In a particular embodiment, the timer 524 can assign a timer interval to a visitor mobile communication device that indicates when the visitor mobile communication device should re-register. The registration indicator 522 can indicate whether a visitor mobile communication is registered. Further, the MSC preference indicator 526 can indicate an MSC preference for a visitor mobile communication device. Also, the ISDN preference indicator 528 can indicate an ISDN preference for a visitor mobile communication device and the VoIP preference indicator 530 can indicate a VoIP preference for the visitor mobile communication device.

In a particular embodiment, the visitor mobile communication device can be connected to an MSC, an ISDN, or a VoIP network based on the preference indicators 526, 528, 530. For example, a particular visitor mobile communication device may want to connect to a VoIP network before an ISDN and an MSC.

Figure 6:
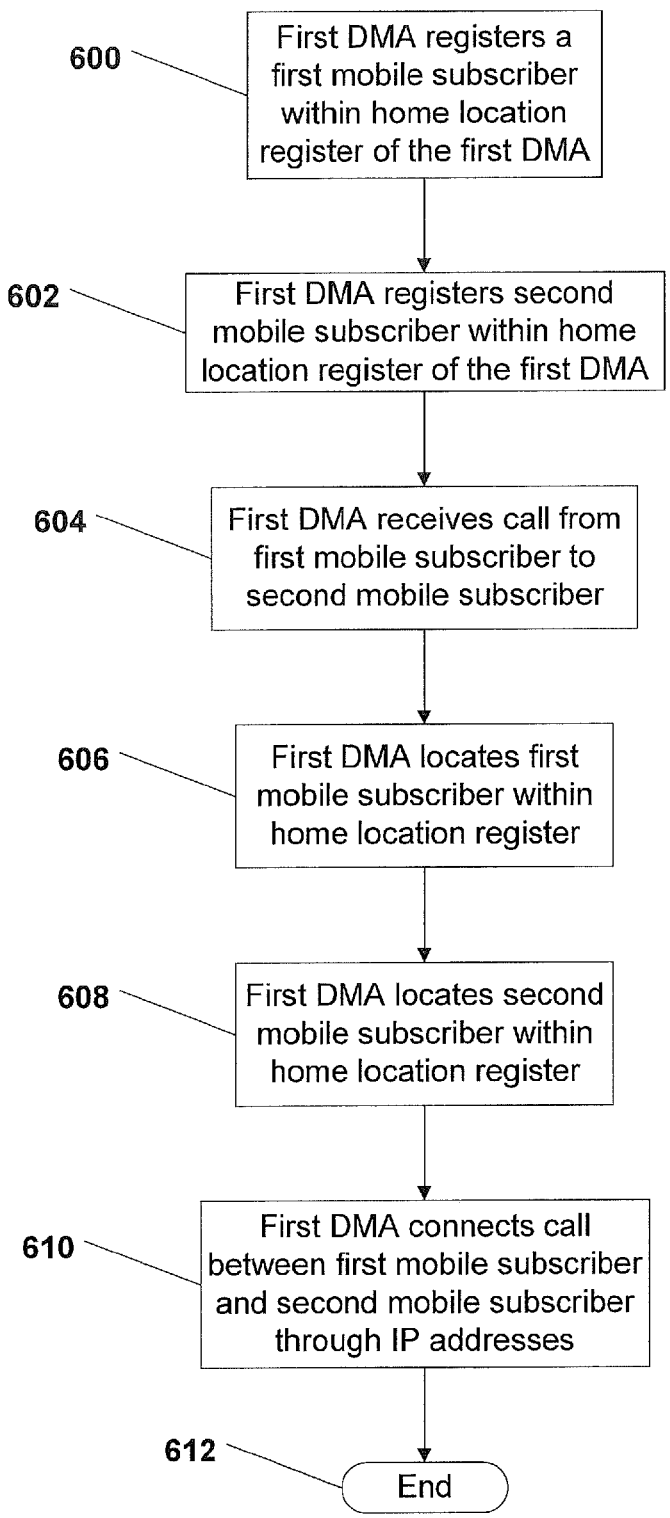
FIG. 6 is a flow chart to illustrate a method of providing a call between a first mobile subscriber and a second mobile subscriber via a single distributed mobile architecture.

Referring to FIG. 6, a method of establishing communication via a distributed mobile architecture (DMA) is shown and commences at block 600. At block 600, the DMA registers a first mobile subscriber within the home location register (HLR) of the DMA. Next, at block 602, the DMA registers a second mobile subscriber within the home location register (HLR) of the DMA. Moving to block 604, the DMA receives a call from the first mobile subscriber to the second mobile subscriber. At block 606, the DMA locates the first mobile subscriber within the home location register of the DMA. Next, at block 608, the DMA locates the second mobile subscriber within the home location register of the DMA. Proceeding to block 610, the DMA connects the call between the first mobile subscriber and the second mobile subscriber via one or more local EP addresses within the DMA. The method then ends at state 612.

Figure 7:
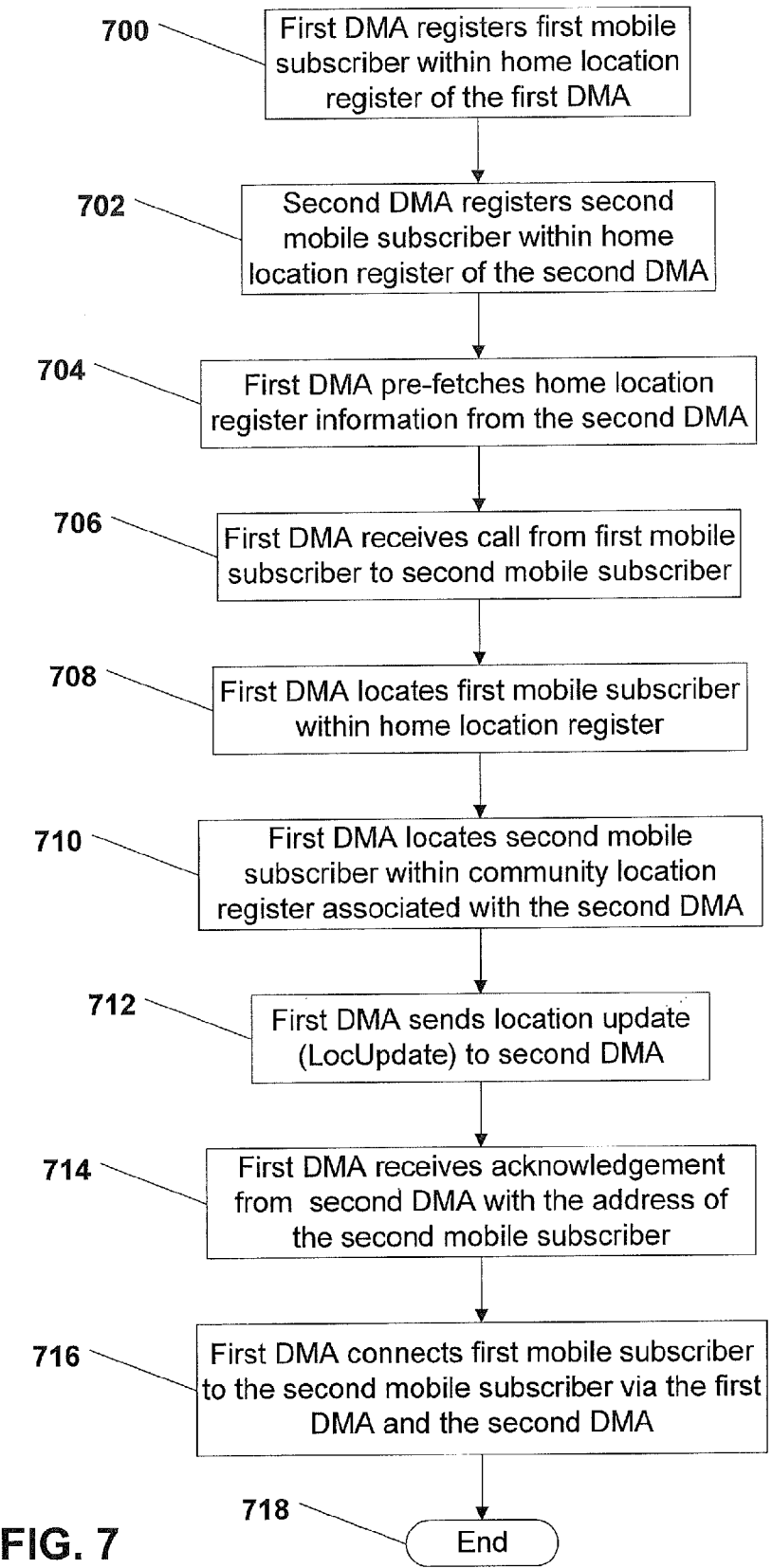
FIG. 7 is a flow chart to illustrate a method of providing a call between a first mobile subscriber and a second mobile subscriber via a first distributed mobile architecture and a second distributed mobile architecture.

FIG. 7 depicts a method of establishing communication via a first distributed mobile architecture (DMA) and a second DMA. Beginning at block 700, the first DMA registers a first mobile subscriber within a home location register (HLR) of the first DMA. At block 702, the second DMA registers a second mobile subscriber within the home location register (HLR) of the second DMA. Thereafter, at block 704, the first DMA pre-fetches the home location register (HLR) information from the second DMA. In a particular embodiment, the first DMA and the second DMA can be linked to each other via an IP network.

Moving to block 706, the first DMA receives a call from the first mobile subscriber to be routed to the second mobile subscriber. At block 708, the first DMA locates the first mobile subscriber within the home location register (HLR) of the first DMA. Proceeding to block 710, the first DMA locates the second mobile subscriber within the second community location register (CLR) associated with the second DMA. At block 712, the first DMA sends a location update request (LocUpdate) to the second DMA. Next, at block 714, the first DMA receives an acknowledgement from the second DMA. In an illustrative embodiment, the acknowledgement includes the current address of the second mobile subscriber within the second DMA. Continuing to block 716, the first DMA connects the first mobile subscriber to the second mobile subscriber via the first DMA and the second DMA by assigning an IP address at both the first DMA and the second DMA. The method then ends at state 718.

Figure 8:
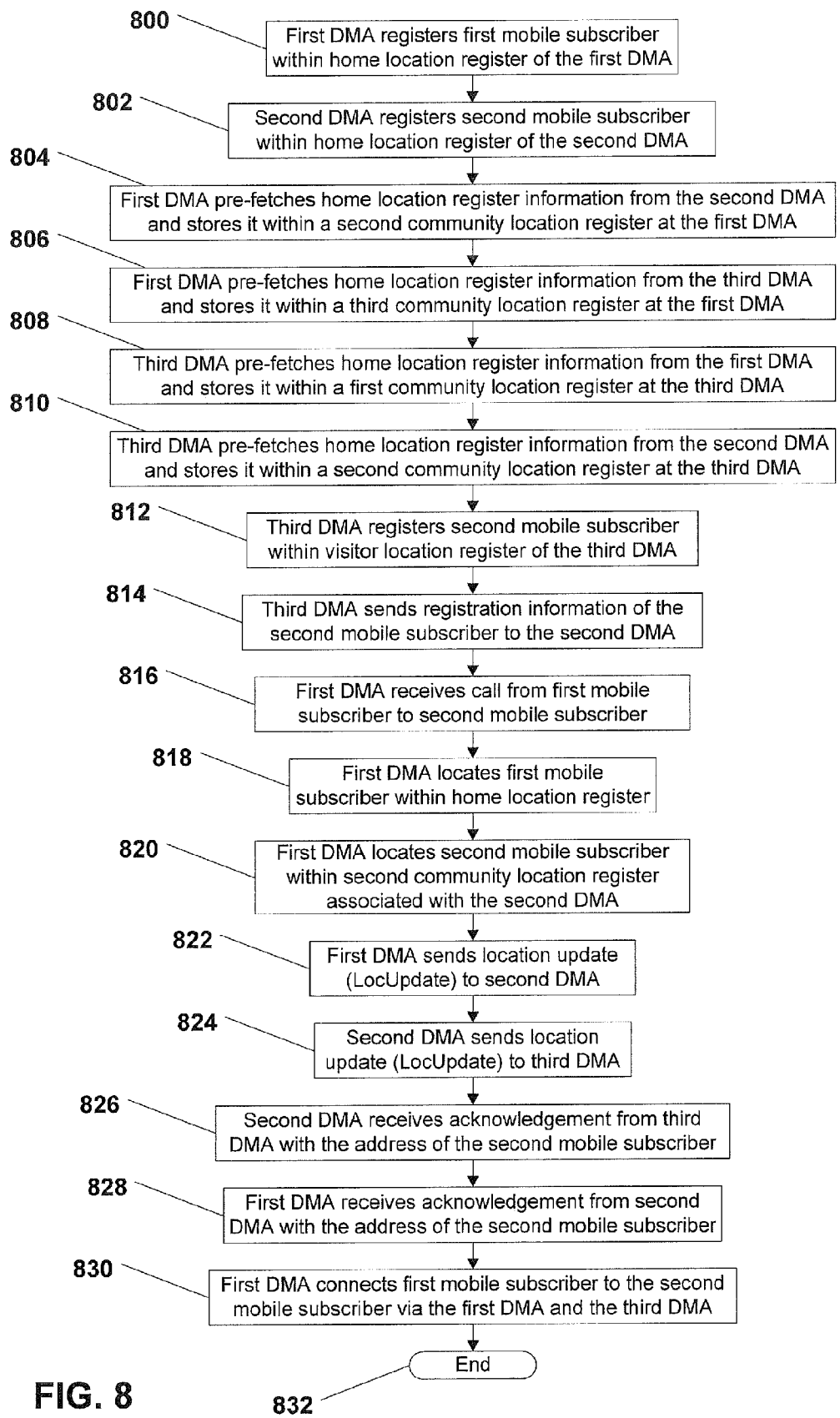
FIG. 8 is a flow chart to illustrate a method of providing a call between a first mobile subscriber and a roaming second mobile subscriber via a first distributed mobile architecture and a third distributed mobile architecture.

Referring to FIG. 8, a method of establishing communication between a first mobile subscriber and a second mobile subscriber that is roaming is shown and commences at block 800. At block 800, a first distributed mobile architecture (DMA) registers a first mobile subscriber within a home location register (HLR) of the first DMA. At block 802, a second DMA registers a second mobile subscriber within a home location register (HLR) of the second DMA. Moving to block 804, the first DMA pre-fetches the home location register (HLR) information from the second DMA and stores it within a second community location register (CLR) at the first DMA. At block 806, the first DMS pre-fetches the home location register (HLR) information from the third DMA and stores it within a third community location register (CLR) at the first DMA.

Moving to block 808, a third DMA pre-fetches the home location register (HLR) information for the first DMA and stores it within a first community location register (CLR) at the third DMA. At block 810, the third DMA pre-fetches the home location register (HLR) information for the second DMA and stores it within a second community location register (CLR) at the third DMA.

Proceeding to block 812, the third DMA registers the second mobile subscriber within a visitor location register (VLR) of the third DMA. In a particular embodiment, this indicates that the second mobile subscriber has roamed into a coverage area controlled by the third DMA. At block 814, the third DMA sends the registration information of the second mobile subscriber to the second DMA.

Moving to block 816, the first DMA receives a call from the first mobile subscriber to be routed to the second mobile subscriber. Thereafter, at block 818, the first DMA locates the first mobile subscriber within the home location register (HLR) of the first DMA. At block 820, the first DMA locates the second mobile subscriber within the second community location register (CLR) that is associated with the second DMA.

Proceeding to block 822, the first DMA sends a location update request (LocUpdate) to the second DMA. At block 824, the second DMA sends the location update (LocUpdate) to the third DMA. Then, at block 826, the second DMA receives an acknowledgement from the third DMA. In a particular embodiment, the acknowledgement includes a current address of the second mobile subscriber within the third DMA. For example, the third DMA can retrieve the current address of the second mobile subscriber from the VLR within the third DMA. Continuing to block 828, the first DMA receives the acknowledgement from the second DMA with the address of the second mobile subscriber. Next, at block 830, the first DMA connects the first mobile subscriber to the second mobile subscriber via the first DMA and the third DMA. For example, an IP address at the third DMA is assigned to the call and is used to route the call over an IP network between the first DMA and the third DMA. The method then ends at state 832.

Figure 9:
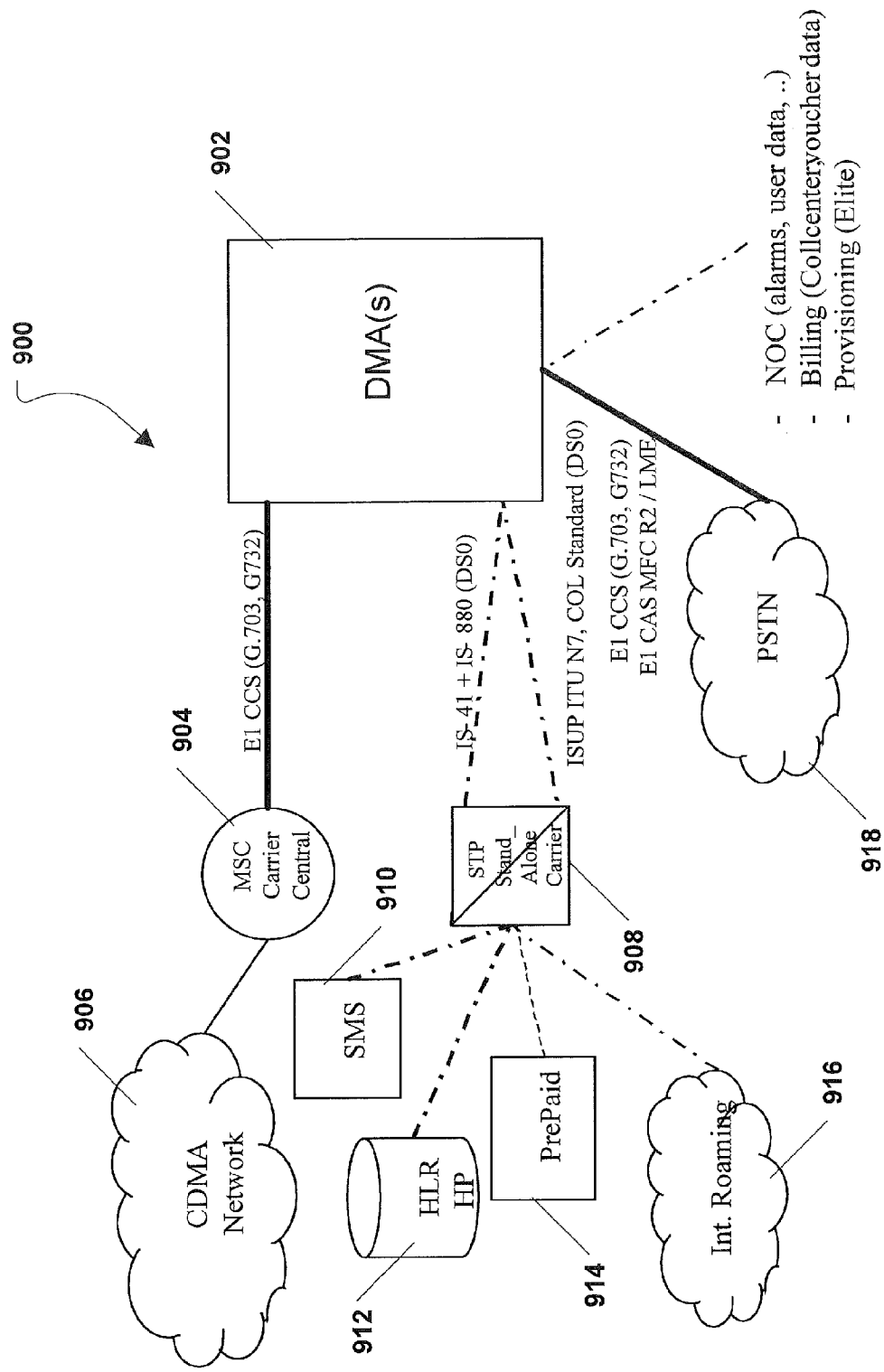
FIG. 9 is a diagram of an exemplary communication system in which a distributed management architecture server can be incorporated.

Referring to FIG. 9, an exemplary, non-limiting embodiment of a telecommunications system is shown and is generally designated 900. As shown, the system includes one or more DMAs 902 that are connected to a wireless carrier's central MSC 904. The DMA(s) 902 can be connected to the MSC 904 via an E1 CCS (G.703, G732) connection, or any other applicable connection. The MSC 904, in turn, is connected to a code division multiple access (CDMA) network 906. FIG. 9 further shows that the DMA(s) 902 can be connected to a switching transfer point (STP) 908 of a stand-alone carrier. As shown, the DMA 902 can be connected to the STP 908 via an IS-41+IS-880 (DS0) connection, or an ISUP ITU N7 connection.

As further depicted in FIG. 9, the STP 908 can be connected to a short messaging service (SMS) server 910 in order to provide text-messaging capabilities for the mobile communication devices using the system 900 shown in FIG. 9. Additionally, the STP 908 can be connected to a home location register (HLR) 912, a pre-paid wireless server 914 and an international roaming network 916 in order to provide pre-paid services and roaming between multiple countries. FIG. 9 shows that the DMA(s) 902 can be connected to the PTSN 918 via an E1 CCS (G.703, G732) connection, or any other appropriate connection.

Figure 10:
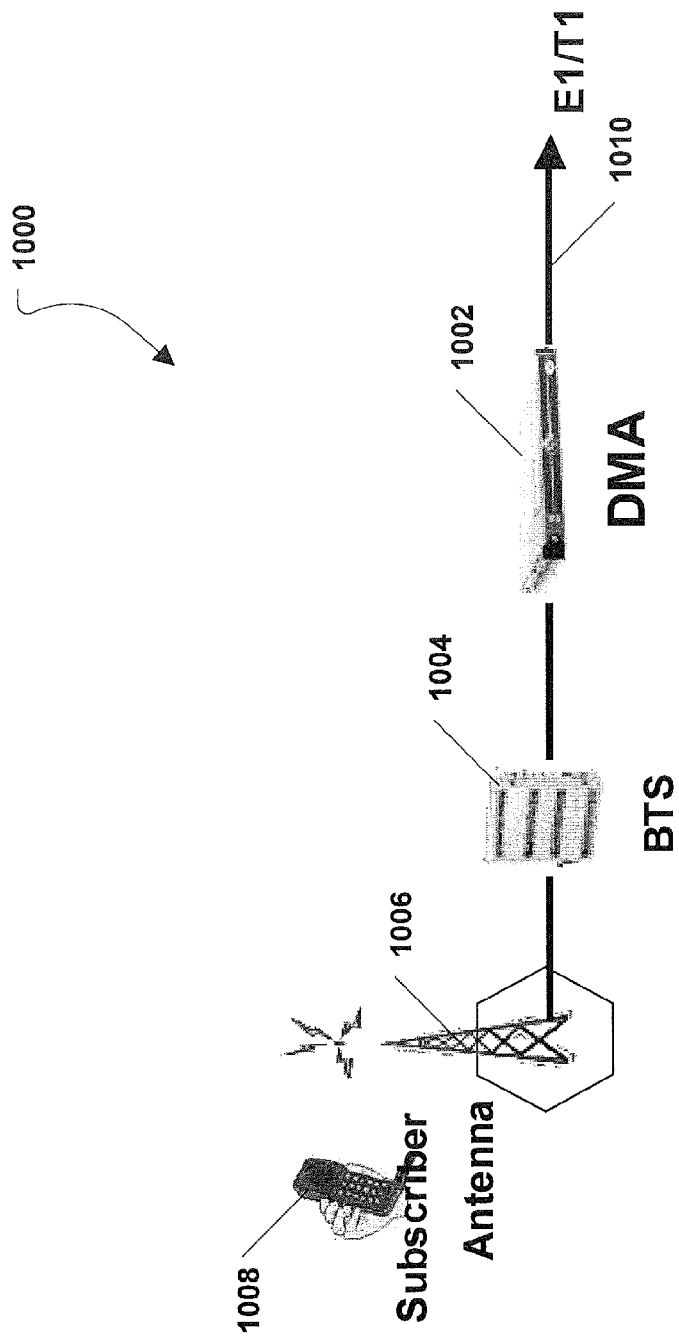
FIG. 10 is a diagram of a wireless local loop communication system in which a distributed management architecture server can be incorporated.

Referring to FIG. 10, a wireless local loop (WLL) system is portrayed and is generally designated 1000. As illustrated in FIG. 10, the system 1000 includes a DMA 1002 that is connected to a BTS 1004. The BTS 1004, in turn, is connected to an antenna 1006. The antenna 1006 provides cellular coverage for one or more subscribers 1008 within transmission distance of the antenna 1006. FIG. 10 indicates that the system 1000 can further include a data network connection 1010 from the DMA 1002. The data network connection 1010 can connect the DMA 1002 to the PSTN via an ISUP/ISDN signaling connection on an SS7 link set or a T1/E1 wireless connection. Further, the data network connection 1010 can be an IEEE 802.11 connection between the DMA 1002 depicted in FIG. 10 and other DMAs not shown. The DMA 1002 can beneficially utilize existing infrastructure used for cellular and SMS data services.

Figure 11:
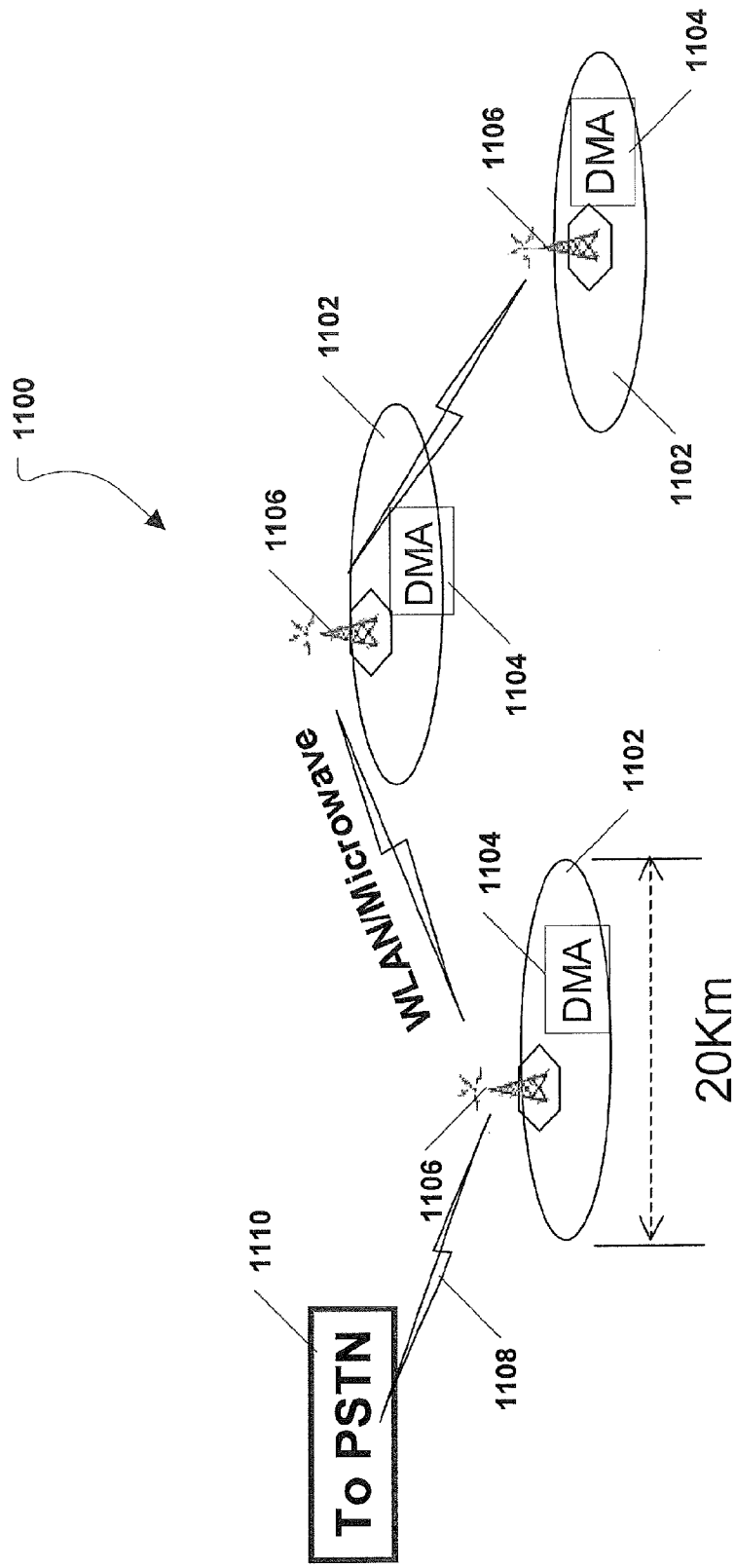
FIG. 11 is a diagram of plural wireless local loop communication systems connected to the public switched telephone network via a single back-haul connection.

FIG. 11 shows a multi-WLL system, generally designated 1100. As shown, the system 1100 includes a plurality of WLLs 1102. Each WLL 1102 can include a DMA 1104 and an antenna 1106 connected thereto to provide a cellular coverage site around the antenna 1106. As illustrated in FIG. 11, the WLLs 1102 can be interconnected via a wireless local area network (WLAN), or a wide area network, such as a microwave connection. Moreover, a DMA 1104 within one of the WLLs 1102 can provide a back-haul connection 1108 to the PSTN 1110. This type of deployment scenario can greatly reduce the costs associated with a wireless system. Since the DMAs 1104 are connected to each other via the WLAN or microwave connections, the relatively expensive inter-site back-haul component is removed. Further, using the hand-off logic, the DMAs 1104 can enable roaming between the WLLs 1102 and can further provide roaming to an external wireless or other network.

Figure 12:
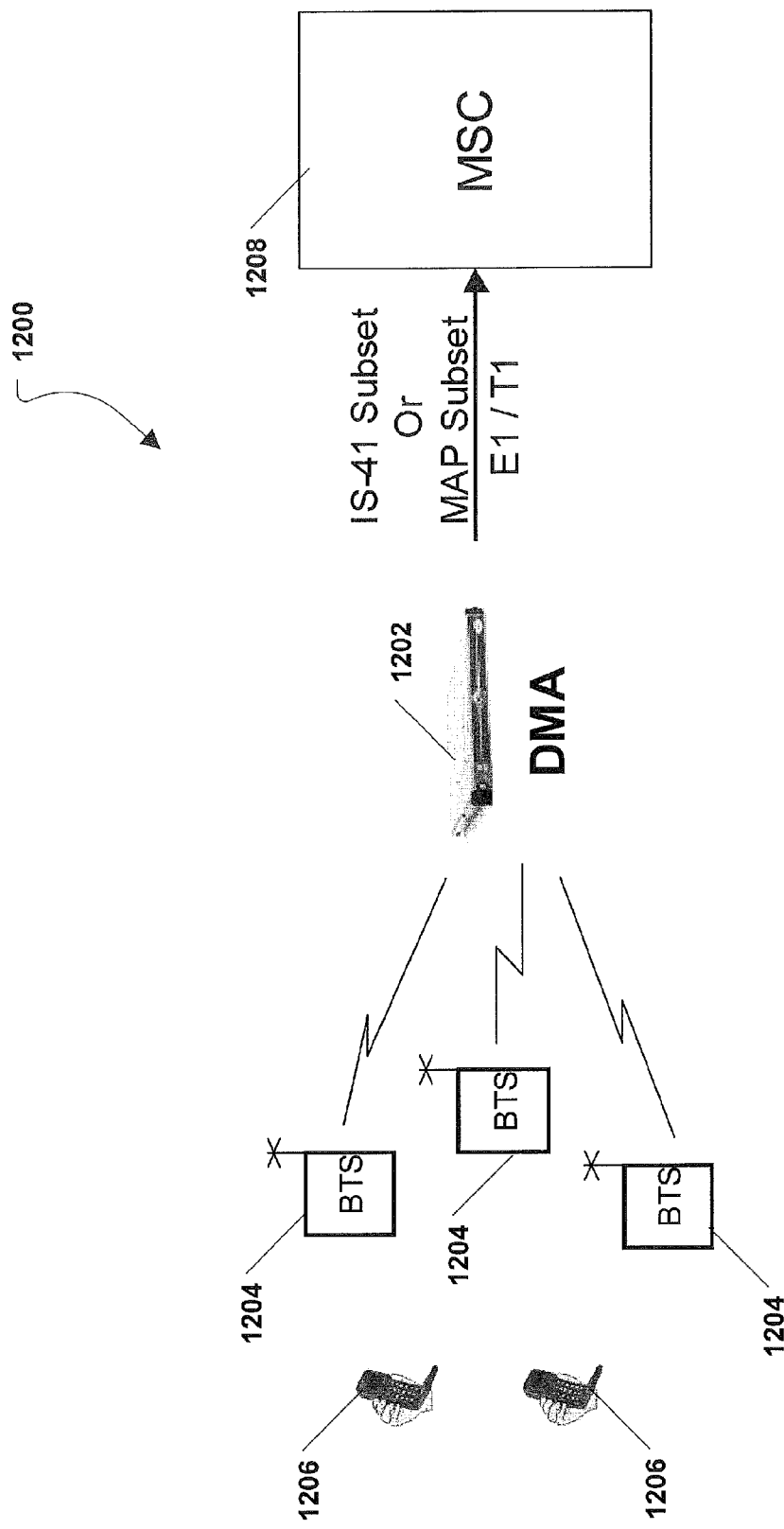
FIG. 12 is a diagram of a communication system in which a distributed management architecture server can be deployed to extend an existing cellular network.

Referring to FIG. 12, a telecommunications system is depicted and is designated 1200. As illustrated in FIG. 12, the system 1200 includes a DMA 1202 that can be connected to a plurality of BTSs 1204. Each BTS 1204 can provide cellular coverage for one or more mobile communication devices 1206, e.g., one or more mobile handsets configured to communicate via the DMA 1202. FIG. 12 further shows that the DMA 1202 can be connected to an MSC 1208, such as an MSC of an existing cellular system. The DMA 1202 can be connected to the MSC via an IS-41 subset or a MAP subset over a wireless E1/T1 connection. With this implementation, the DMA 1202 can extend an existing cellular network when connected to an existing cellular system MSC 1208.

Figure 13:
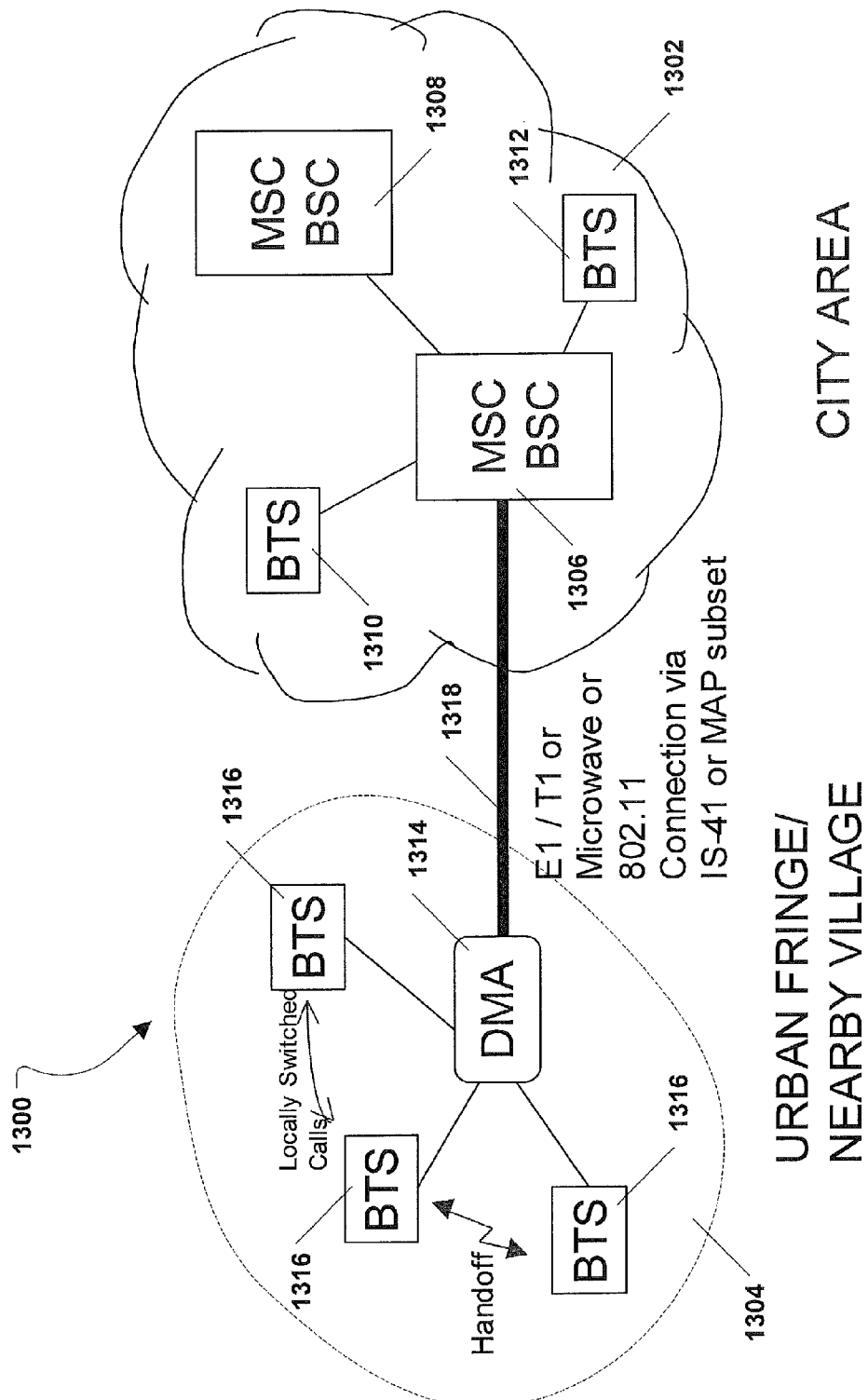
FIG. 13 is a diagram of a communication system in which a distributed management architecture server can be deployed to cover urban fringe around an existing network.

FIG. 13 shows an additional telecommunications system, generally designated 1300. As shown, the system 1300 includes a city area coverage site 1302 and an urban fringe/nearby village coverage site 1304. In an exemplary, non-limiting embodiment, the city area coverage site 1302 includes a first MSC/BSC center 1306 connected to a second MSC/BSC center 1308. Also, a first representative BTS 1310 and a second representative BTS 1312 are connected to the first MSC/BSC center 1306. The particular deployment of equipment is configured to provide adequate cellular coverage for mobile communication devices within the city area coverage site 1302.

As illustrated in FIG. 13, the urban fringe/nearby village coverage site 1304 includes a DMA 1314 having a plurality of BTSs 1316 connected thereto. The DMA 1314 can provide hand-off of calls between the BTSs 1316 and can switch calls made between the BTSs 1316 locally. However, the DMA 1314 within the urban fringe/nearby village coverage site 1304 can also connect telephony traffic to the first MSC/BSC center 1306 within the city area coverage site 1302 via a data network connection 1318. In one embodiment, the data network connection can be an E1 connection, a T1 connection, a microwave connection, or an 802.11 connection established via an IS-41 subset or MAP subset. The deployment of a DMA 1314 in a location such as that described above, i.e., in urban fringe or in a nearby village, and the connection of the DMA 1314 to an MSC/BSC center 1306 in a city area, can provide service to potential wireless customers that typically would not receive cellular coverage from the city area cellular coverage site 1302. Thus, new subscribers receive access to wireless communication service and can further communicate with wireless customers within the city area cellular coverage site 1302.

Referring now to FIG. 14, another telecommunications system is depicted and is designated 1400. As illustrated in FIG. 14, the system 1400 includes a DMA 1402 that can be connected to a plurality of BTSs 1404. Each BTS 1404 can provide cellular coverage for one or more mobile communication devices 1406. FIG. 14 further shows that the DMA 1402 can include a data network connection 1408 that provides a back-haul connection to the PSTN 1410. In one embodiment, the data network connection can be an E1 connection, a T1 connection, a cable connection, a microwave connection, or a satellite connection. Moreover, the system 1400 depicted in FIG. 14 can be deployed using CDMA IS-95, CDMA 1X, GSM/GPRS, W-CDMA, or other industry standard technologies.

Using a single back-haul connection greatly minimizes costs associated with the wireless communication network. Further, the system 1400 shown in FIG. 14 can be deployed relatively rapidly and can be maintained remotely. Additionally, with the inclusion of the OAMP module 540 (FIG. 5) and the AAA module 528 (FIG. 5), subscriber accounts can be managed locally and billing can be performed locally, i.e., within the DMA 1402. Moreover, as the number of subscribers increase, the size of the system can be increased modularly, e.g., by adding DMAs, corresponding BTSs, and the appropriate connections.

Figure 15:
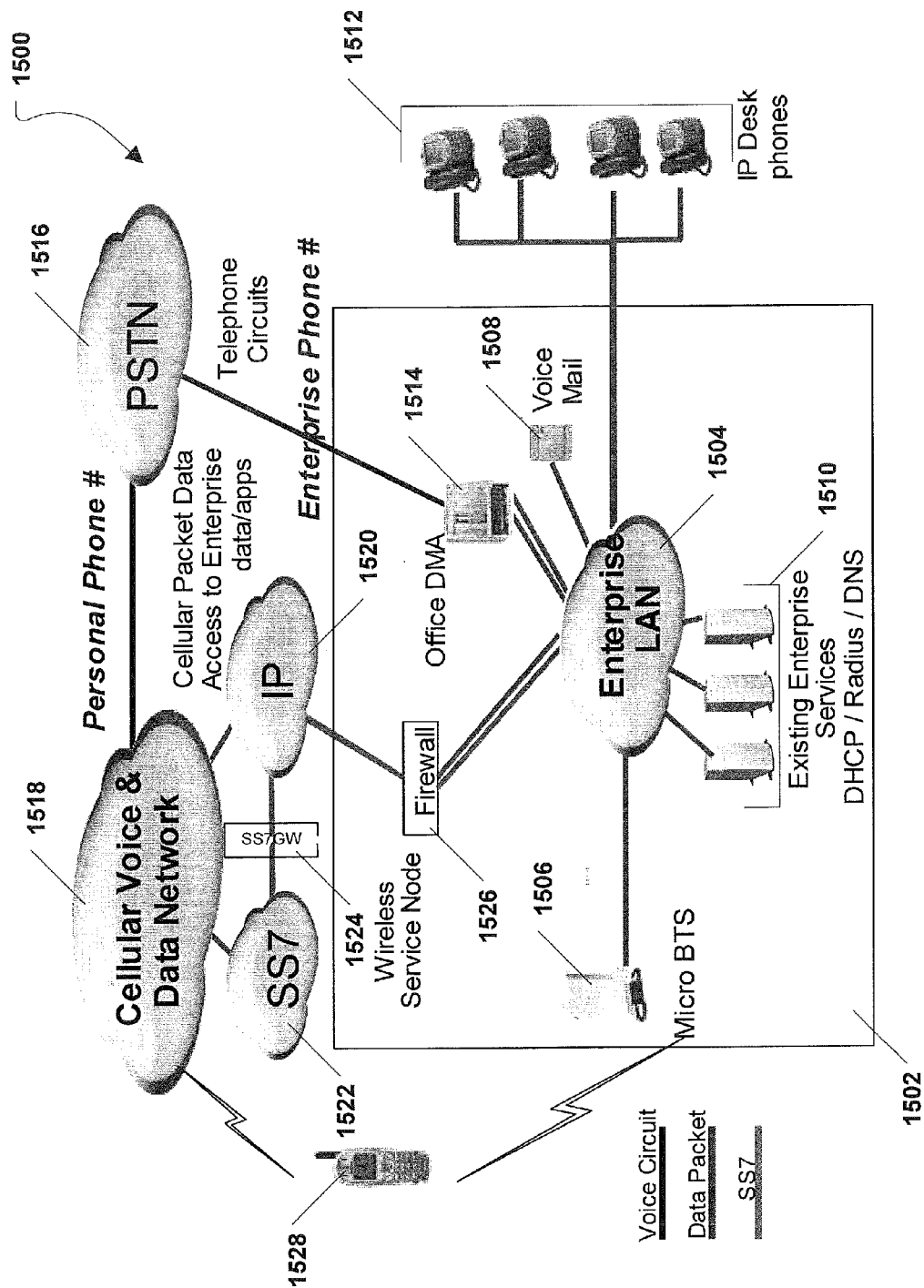
FIG. 15 is a diagram of an in-building communication system in which a distributed management architecture server can be deployed.

FIG. 15 illustrates an in-building telecommunications network that is generally designated 1500. FIG. 15 depicts a structure 1502, e.g., an office building, a commercial building, a house, etc. An enterprise local area network (LAN) 1504 is installed within the building 1502. A micro-BTS 1506 is connected to the enterprise LAN 1504. Moreover, a voice mail server 1508 and plural enterprise services servers 1510 are connected to the enterprise LAN 1504. In an exemplary, non-limiting embodiment, the enterprise services servers 1510 can include a dynamic host configuration protocol (DHCP) server, a radius server, a domain name server (DNS), etc. As depicted in FIG. 15, a plurality of phones 1512, e.g., IP desk phones, can be connected to the enterprise LAN 1504.

FIG. 15 further indicates that an office DMA 1514 can be connected to the enterprise LAN 1504. The office DMA 1514 can also be connected to the PSTN 1516, which, in turn, can be connected to a cellular voice and data network 1518. The enterprise LAN 1504 can also be connected to the cellular voice and data network 1518 via an Internet protocol (IP) network 1520. A signaling system seven (SS7) network 1522 can be connected to the cellular voice and data network 1518 and the IP network 1520. FIG. 15 also depicts an SS7 gateway 1524 between the SS7 network 1522 and the IP network 1520 and a firewall 1526 between the enterprise LAN 1504 and the IP network 1520. FIG. 15 shows a wireless communication device 1528 in communication with the cellular voice and data network 1518 and the micro-BTS 1506.

Figure 16:
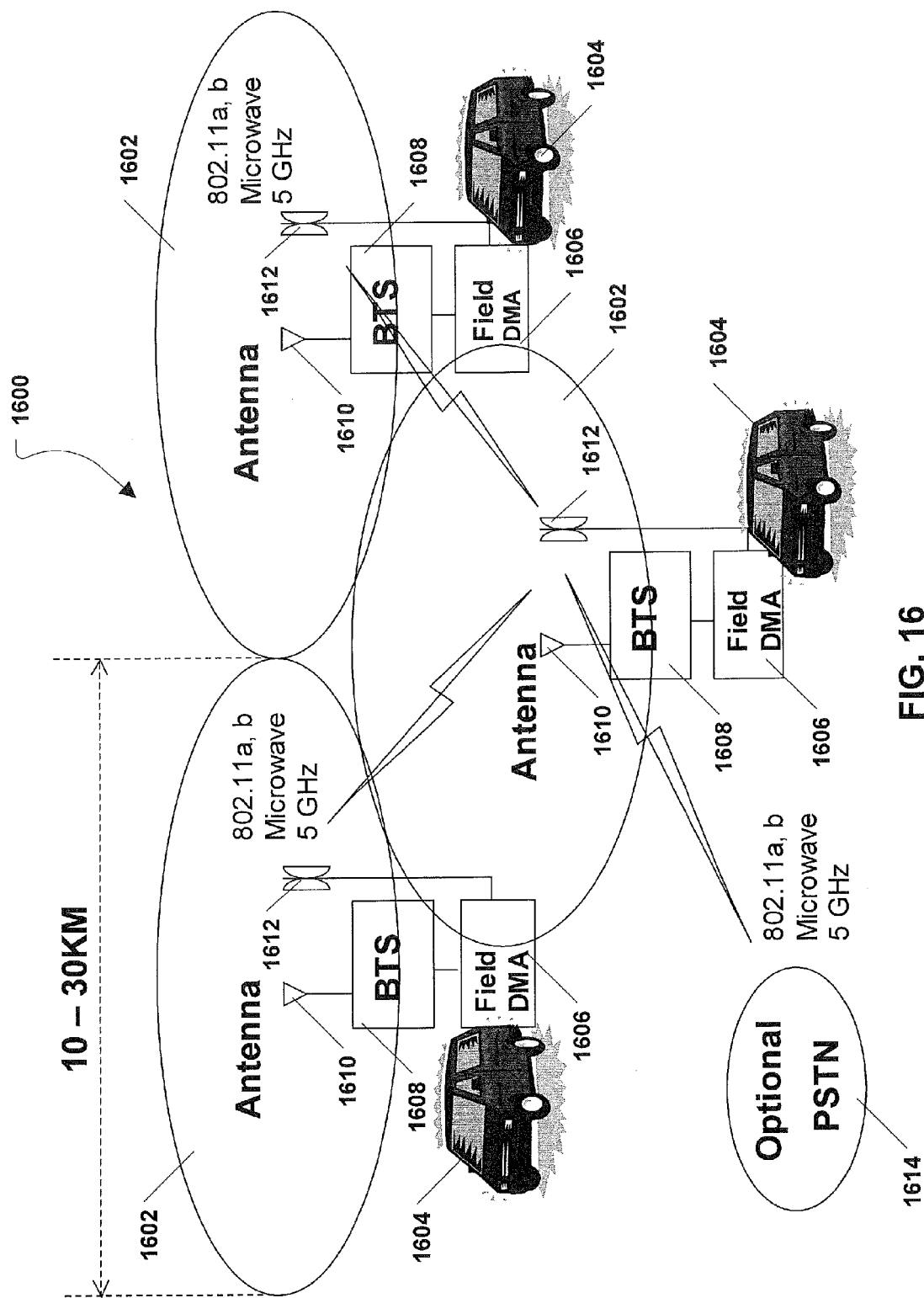
FIG. 16 is a diagram of a mobile in-field communication system in which multiple distributed management architecture servers can be deployed via multiple vehicles.

Referring to FIG. 16, a mobile in-field telecommunications system is depicted and is generally designated 1600. As depicted, the system 1600 includes a plurality of mobile cellular coverage sites 1602. Each mobile cellular coverage site 1602 includes a vehicle 1604 in which a field DMA 1606 is disposed. Moreover, a BTS 1608 is disposed within each vehicle 1604 and is in direct physical connection with the field DMA 1606, e.g., by a wire or cable connected there between. The field DMA 1606 and the BTS 1608 can be removably installed within the vehicle 1604 or permanently affixed therein. FIG. 16 further indicates that each BTS 1608 can include an antenna 1610 that is designed to communicate with mobile communication devices. Also, each field DMA 1606 includes an antenna 1612. In an exemplary, non-limiting embodiment, the field DMAs 1606 can communicate wirelessly with each other via the antennae 1612, e.g., via 802.11a, 802.11b, microwaves, or other wireless link.

The mobile cellular coverage sites 1602 can be deployed to provide a temporary web of cellular coverage for a plurality of mobile communication devices, e.g., devices carried by soldiers during a battle. The mobile in-field communications system 1600 can be recalled, moved, and re-deployed as necessary. Further, the system can include a wireless connection, e.g., 802.11a, 802.11b, microwaves, to the PSTN 1614.

Figure 17:
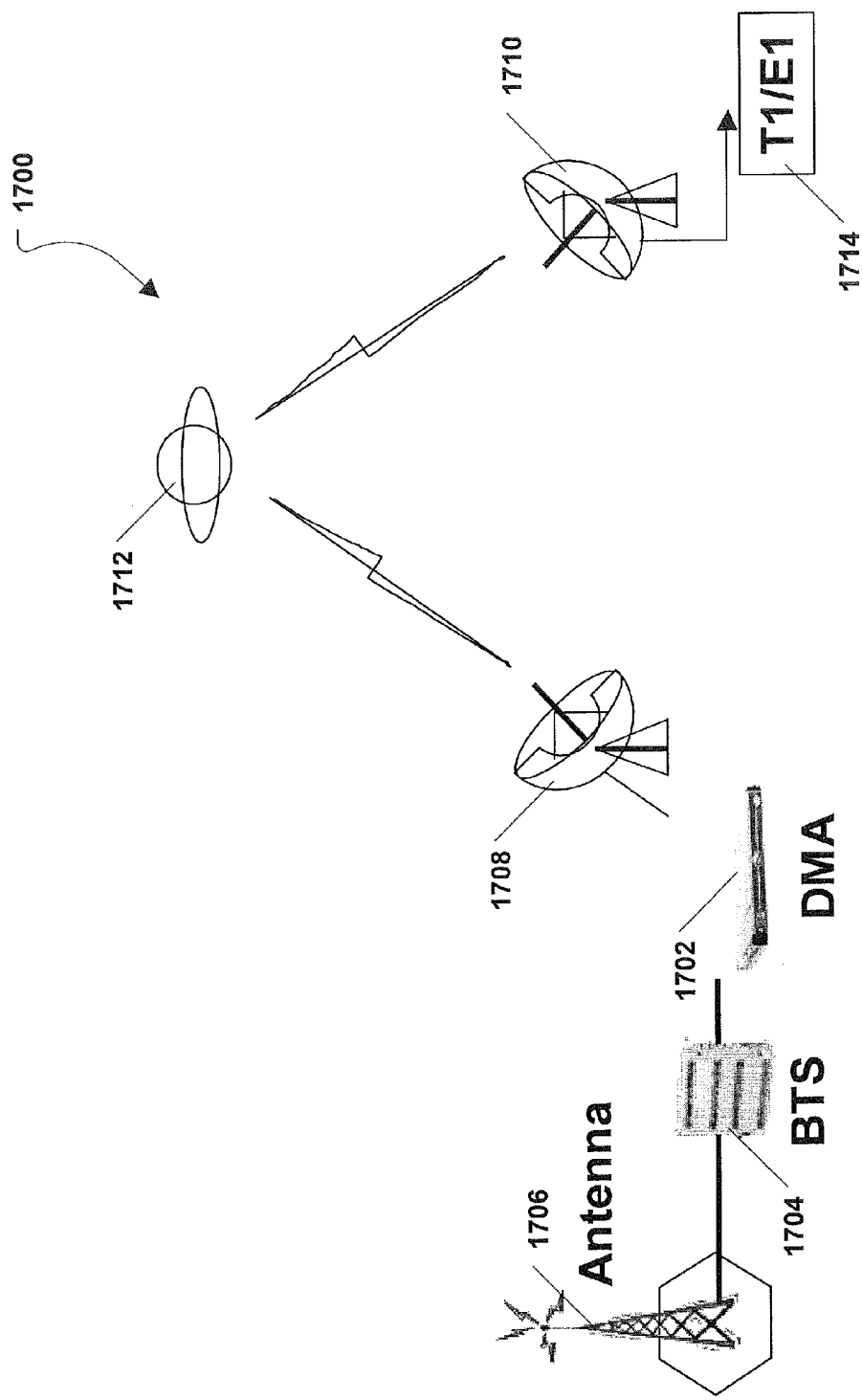
FIG. 17 is a diagram of a communication system in which a distributed management architecture server can utilize a satellite connection as a backhaul connection.

Referring to FIG. 17, still another telecommunications system is illustrated and is generally designated 1700. As depicted in FIG. 17, the system 1700 includes a DMA 1702 that is connected to a BTS 1704. The BTS 1704, in turn, is connected to an antenna 1706. FIG. 17 further illustrates that a first satellite transceiver 1708 is also connected to the DMA 1702. The first satellite transceiver 1708 communicates with a second satellite transceiver 1710 via a satellite 1712. Additionally, the second satellite transceiver 1710 includes a data network connection 1714, e.g., a T1 connection, or an E1 connection. The satellite transceivers 1708, 1710 and the satellite 1712 can provide a backhaul connection for the DMA 1702. Or, the satellite transceivers 1708, 1710 and the satellite 1712 can connect the DMA 1702 to an additional DMA (not shown).

Figure 18:
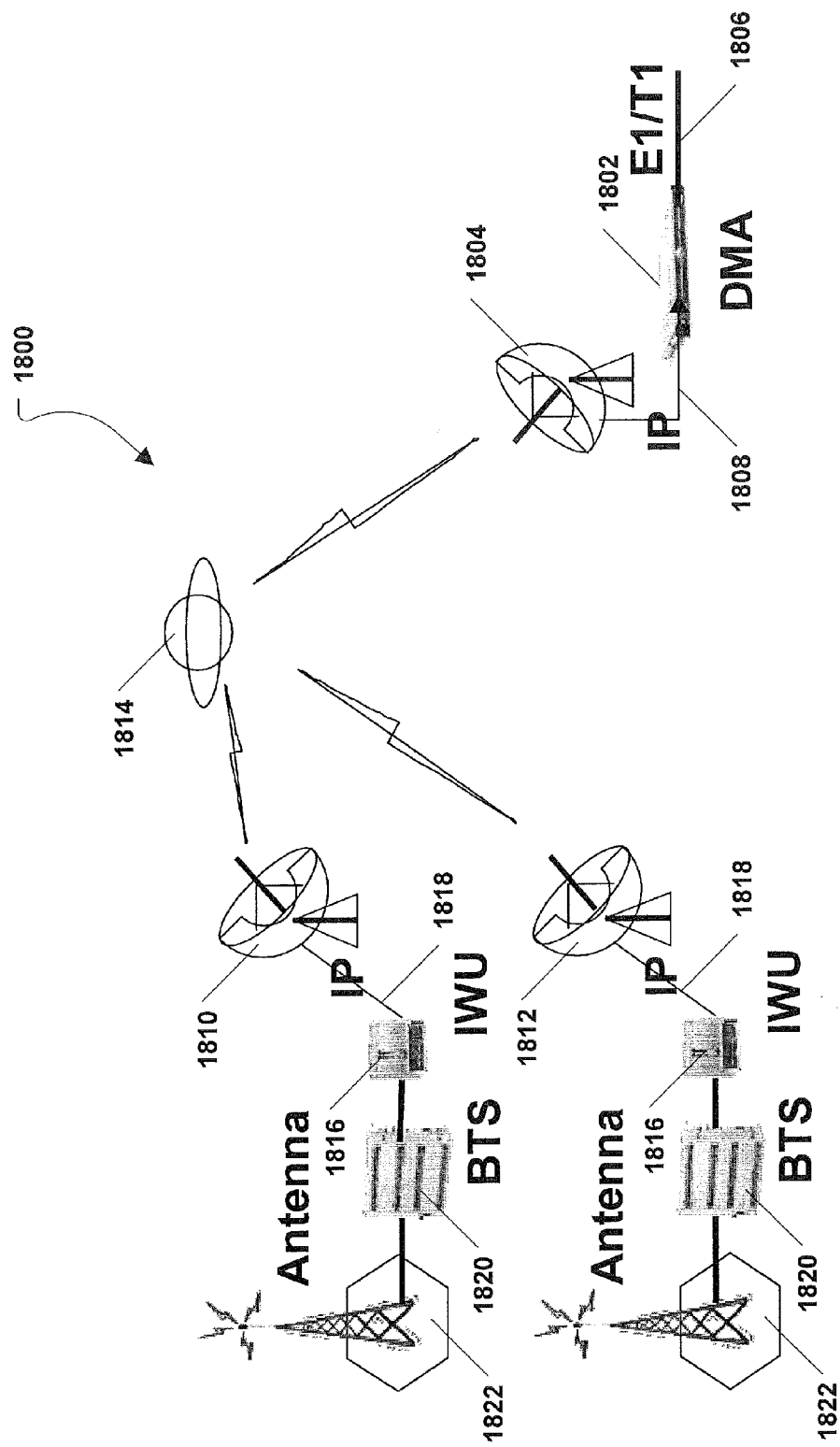
FIG. 18 is a diagram of a communication system in which a distributed management architecture server can receive multiple backhaul signals via multiple satellite signals.

FIG. 18 shows yet another telecommunications system that is generally designated 1800. As illustrated in FIG. 18, the system includes a DMA 1802 that is connected to a first satellite transceiver 1804. Moreover, the DMA 1802 includes a primary network connection 1806, e.g., a T1 connection, or an E1 connection, and a secondary network connection 1808, e.g., an IP connection. FIG. 18 shows that the first satellite transceiver 1804 communicates with a second satellite transceiver 1810 and a third satellite transceiver 1812 via a satellite 1814. Each of the second and third satellite transceivers 1810, 1812 is connected to an interworking unit (IWU) 1816 via a data network connection 1818, e.g., an IP connection. Each IWU 1816 is connected to a BTS 1820, which in turn, is connected to an antenna 1822. The satellite transceivers 1804, 1810, 1812 provide an IP network extension for the DMA 1802. Moreover, in the deployment illustrated in FIG. 18, the DMA 1802 can act as a centralized micro-switch for handling calls received at the antennas 1822 and transmitted via the second and third satellite transceivers 1810, 1812.

Figure 19:
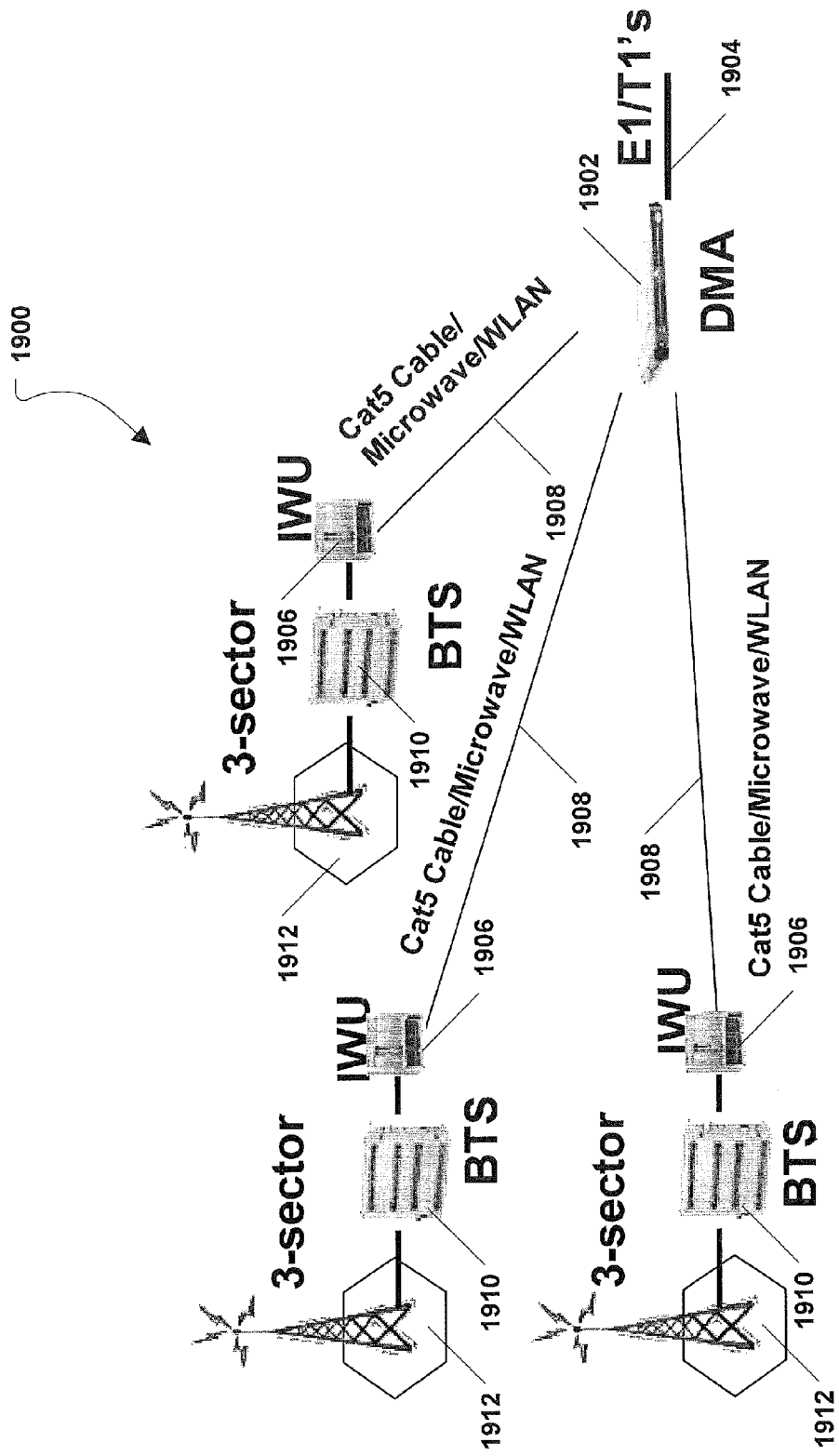
FIG. 19 is a diagram of a communication system in which a single distributed management architecture server can be connected to multiple base transceiver stations.

Referring to FIG. 19, another telecommunications system is depicted and is designated 1900. As shown, the system 1900 includes a DMA 1902 having a primary network connection 1904. Moreover, the DMA 1902 can be connected to a plurality of IWUs 1906. In an exemplary, non-limiting embodiment, the DMA 1902 can be connected to each IWU 1906 via a secondary network connection 1908, such as a category five (Cat 5) cable connection, a microwave connection, or a WLAN connection. Further, each IWU 1906 is connected to a BTS 1910 and each BTS 1910, in turn, is connected to an antenna 1912. Each BTS 1910 can be a 3-sector BTS. In the deployment depicted in FIG. 19, the DMA 1902 can act as a centralized micro-switch that can be used to handle telephony traffic received at the antennae 1912.

Figure 20:
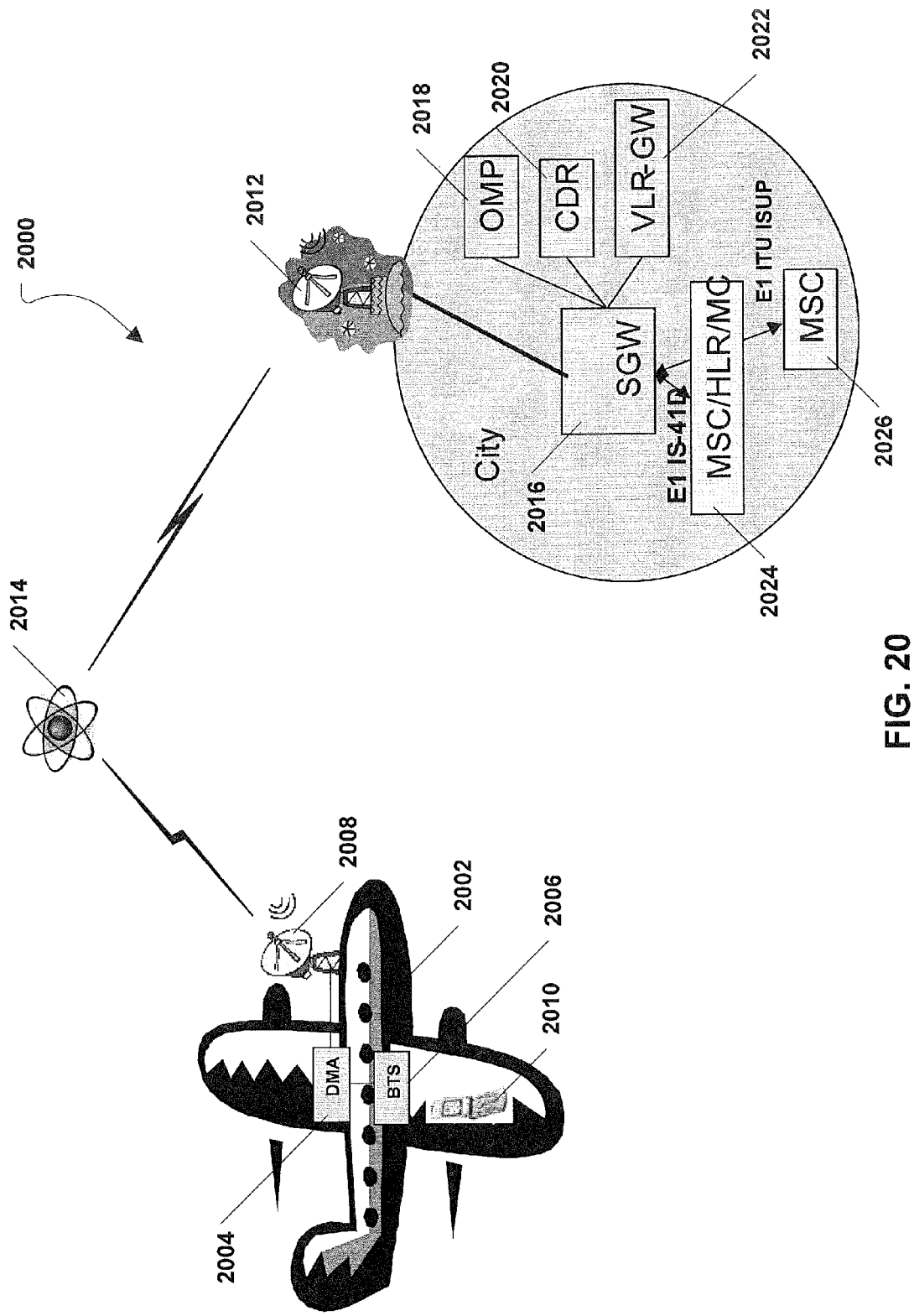
FIG. 20 is a diagram of a mobile communication system in which a distributed management architecture server can be deployed via an airplanes.

FIG. 20 illustrates yet another embodiment of a communications system, designated 2000. As shown, the system 2000 includes an airplane 2002 in which a DMA 2004 is installed. As shown, the DMA 2004 is coupled to a BTS 2006 and a first satellite transceiver 2008. FIG. 20 also shows a mobile communication device 2010 within the airplane 2002. The mobile communication device 2010 can be in wireless communication with the BTS 2006.

In a particular embodiment, the first satellite transceiver 2008 can communicate with a second satellite transceiver 2012 via a satellite 2014. As shown, the second satellite transceiver 2012 can be connected to a terrestrial server gateway 2016, e.g. a DMA gateway, that can provide connectivity to an operations and management platform (OMP) 2018, a call detail record (CDR) 2020, and a visitor location register gateway (VLR-GW) 2022. The OMP 2018, the CDR 202, and the VRL-GW 2022 can be separate from or incorporated within the server gateway 2016. FIG. 20 further shows that the server gateway 2016 can be connected to a first mobile switching center (MSC) 2024 that is coupled to a second MSC 2026.

Accordingly, the system 2000 shown in FIG. 20 can allow a user in the airplane 2002 to communicate with a ground based telephone. For example, the mobile communication device 2010 can communicate with the BTS 2006, which, in turn, can communicate with the first satellite transceiver 2008 via the DMA 2004. Further, the first satellite transceiver 2008 can transmit the call to a ground based communication system via the second satellite transceiver 2012 and the satellite 2014.

FIG. 20 shows a single airplane, however, multiple airplanes can be configured as described herein to provide communication from multiple airplanes to ground based telephones. Further, airplane-to-airplane communication can be provided. Additionally, the system 2000 can include other airborne vehicles, e.g., blimps.

Figure 21:
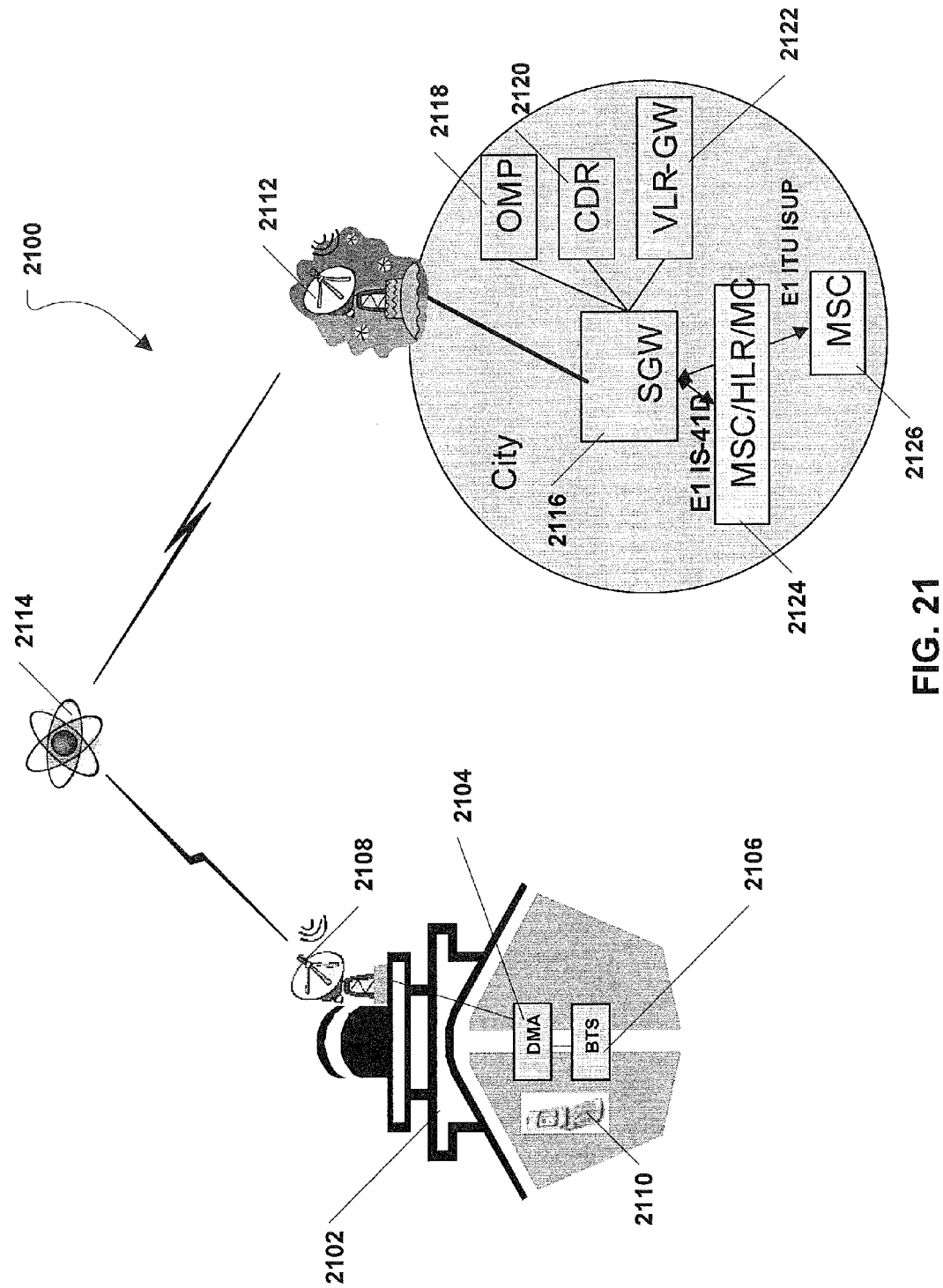
FIG. 21 is a diagram of a mobile communication system in which a distributed management architecture server can be deployed via a ship.

FIG. 21 illustrates yet another embodiment of a communications system, designated 2100. As shown, the system 2100 includes a ship 2102 in which a DMA 2104 is installed. As shown, the DMA 2104 is coupled to a BTS 2106 and a first satellite transceiver 2108. FIG. 21 also shows a mobile communication device 2110 within the ship 2102. The mobile communication device 2110 can be in wireless communication with the BTS 2106.

In a particular embodiment, the first satellite transceiver 2108 can communicate with a second satellite transceiver 2112 via a satellite 2114. As shown, the second satellite transceiver 2112 can be connected to a terrestrial server gateway 2116, e.g. a DMA gateway, that can provide connectivity to an operations and management platform (OMP) 2118, a call detail record (CDR) 2120, and a visitor location register gateway (VLR-GW) 2122. The OMP 2118, the CDR 212, and the VRL-GW 2122 can be separate from or incorporated within the server gateway 2116. FIG. 21 further shows that the server gateway 2116 can be connected to a first mobile switching center (MSC) 2124 that is coupled to a second MSC 2126.

Accordingly, the system shown in FIG. 21 can allow a user within the ship 2102 to communicate with a ground-based telephone. For example, the mobile communication device 2110 can communicate with the BTS 2106, which, in turn, can communicate with the first satellite transceiver 2108 via the DMA 2104. Further, the first satellite transceiver 2108 can transmit the call to a ground based communication system via the second satellite transceiver 2112 and the satellite 2114.

FIG. 21 shows a single ship, however, multiple ships can be configured as described herein to provide communication from multiple ships to ground based telephones. Further, ship-to-ship communication can be provided. Additionally, the system 2100 can include other waterborne vehicles.

Figure 22:
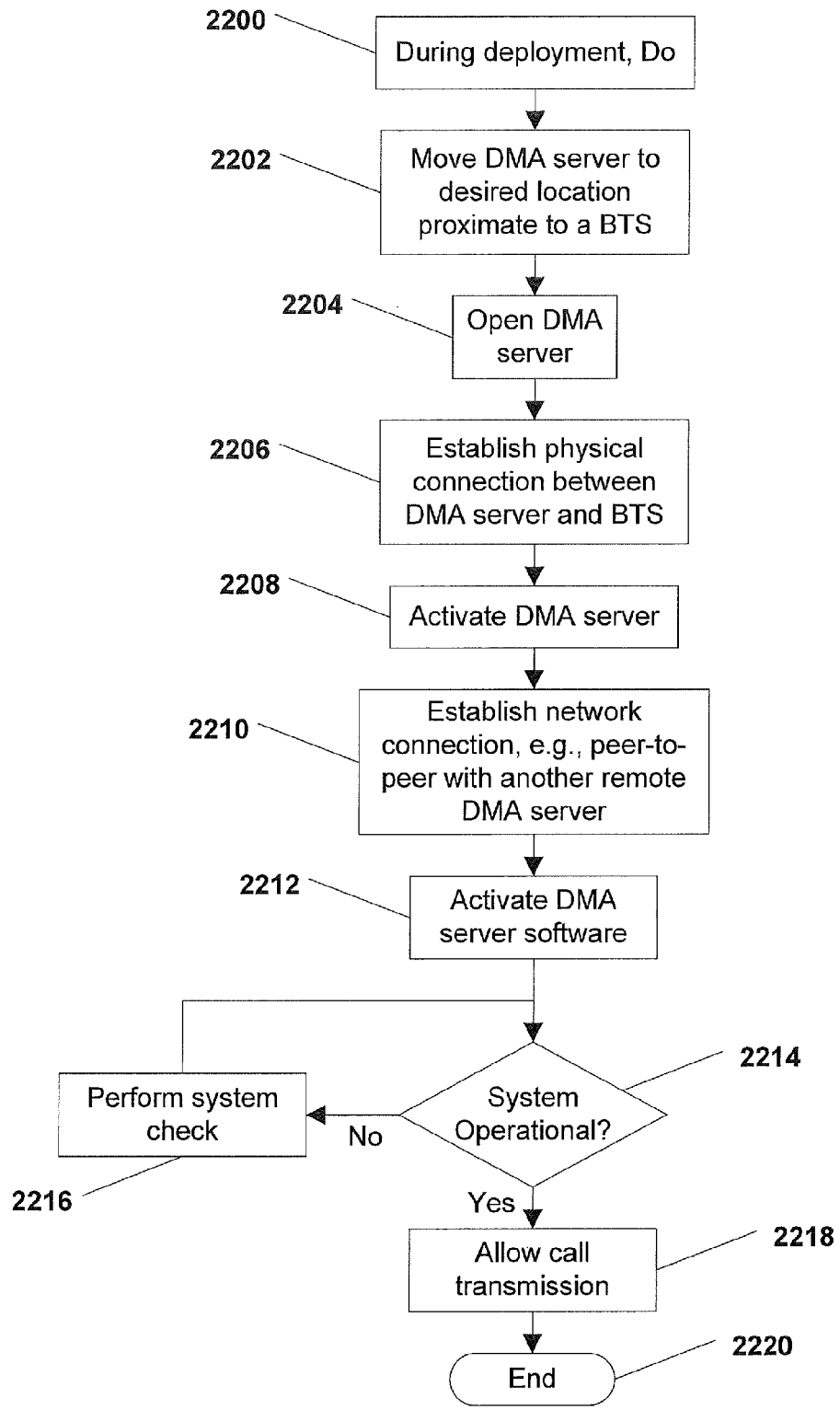
FIG. 22 is a flow chart to illustrate a method of deploying a distributed management architecture server.

Referring to FIG. 22, a method of deploying a distributed management architecture server is shown and commences at block 2200 wherein during deployment, the succeeding steps are performed. At block 2202, the DMA is moved to a desired location proximate to a BTS. Moving to block 2204, the DMA is opened. For example, if the DMA is the DMA shown in FIG. 1, the latch is unlocked and the lid is rotated about the hinges into the open position. Proceeding to block 2206, a physical connection is established between the DMA and the BTS, e.g., the BTS is coupled to the DMA via a wire.

Continuing to block 2208, the DMA is activated, e.g., powered on. At block 2210, a network connection is established with another remote DMA. In a particular embodiment, the network connection is a peer-to-peer connection between the DMAs. Moving to block 2212, DMA software within the DMA is activated. Thereafter, at decision step 2214, it is determined whether the system is operational. That decision can be a performed by the DMA, e.g., by a self-diagnostic routine or module within the DMA. Alternatively, that decision can be determined manually by a technician. If the system is not operational, a system check is performed at block 2216. In a particular embodiment, the system check performed at block 2216 is performed by a self-diagnostic routine or module within the DMA. On the other hand, a technician can perform the system check. After the system check, the logic then returns to decision step 2214 and continues as described herein. At decision step 2214, if the system is operational, the method proceeds to block 2218 and call transmission is allowed. The method then ends at state 2220.

Figure 23:
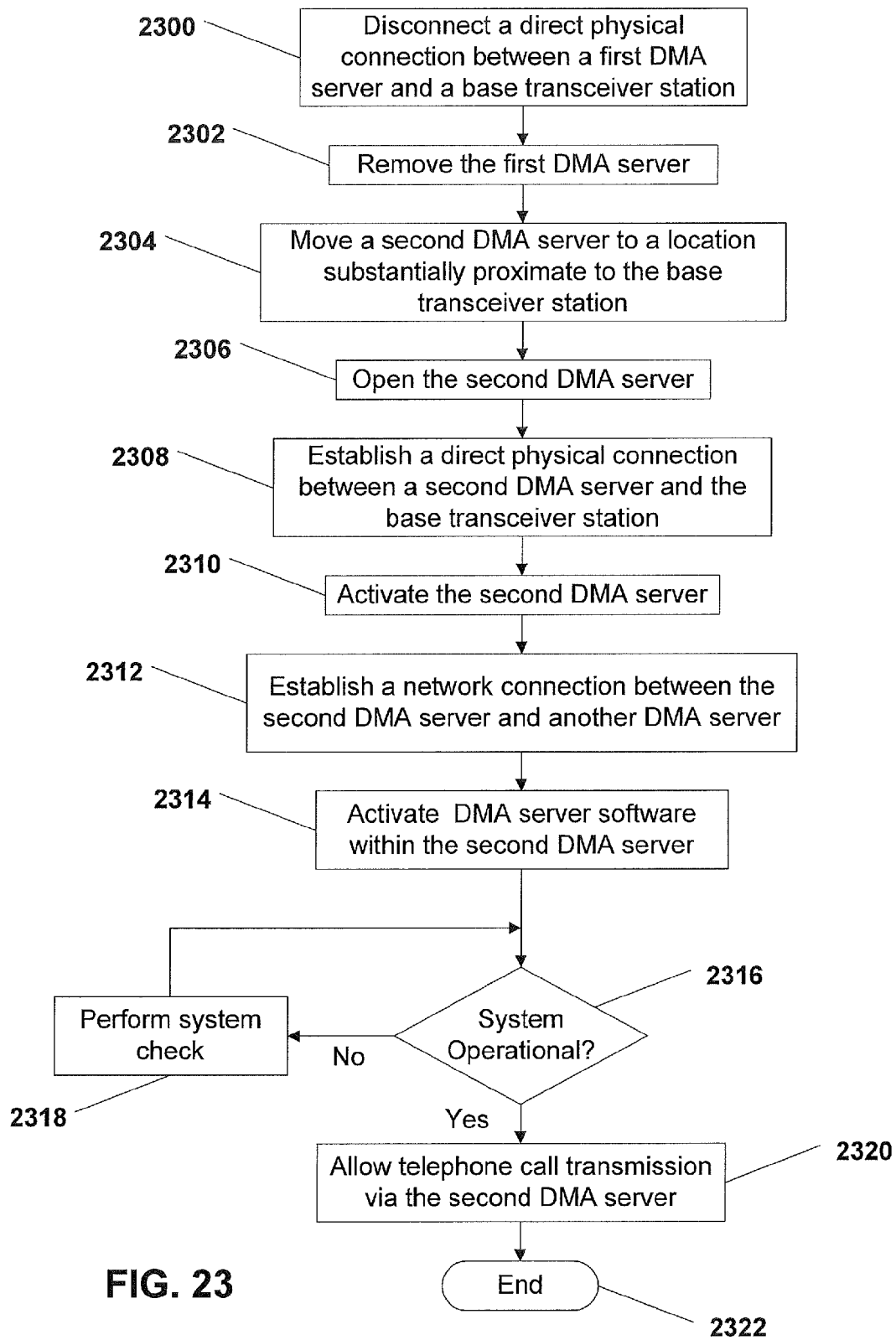
FIG. 23 is a flow chart to illustrate a method of replacing a distributed management architecture server.

Referring to FIG. 23, a method of deploying a distributed management architecture server is shown and commences at block 2300 wherein a direct physical connection between a first DMA and a base transceiver station is disconnected. At block 2302, the first DMA is removed. Proceeding to block 2304, a second DMA is moved to a location that is substantially proximate to the base transceiver station. At block 2306, the second DMA is opened. For example, if the DMA is the DMA shown in FIG. 1, the latch is unlocked and the lid is rotated about the hinges into the open position. Next, at block 2308, a direct physical connection is established between the second DMA and the base transceiver station.

Continuing to block 2310, the second DMA is activated. At block 2312, a network connection is established between the second DMA and another remote DMA. In a particular embodiment, the network connection is a peer-to-peer IP connection between the DMAs. Further, in a particular embodiment, the peer-to-peer connection is established via a private IP network. At block 2314, DMA software within the second DMA is activated.

Proceeding to decision step 2316, it is determined whether the system is operational. That decision can be a performed by the second DMA, e.g., by a self-diagnostic routine or module within the second DMA. Alternatively, the decision can be determined manually by a technician. If the system is not operational, a system check is performed at block 2318. In a particular embodiment, the system check performed at block 2318 is performed by a self-diagnostic routine or module within the second DMA. On the other hand, a technician can perform the system check. After the system check, the logic then returns to decision step 2316 and continues as described herein. At decision step 2316, if the system is operational, the method proceeds to block 2320 and call transmission is allowed via the second DMA. The method then ends at state 2322.

With the configuration of structure described above, the present disclosure provides a flexible telecommunications system, i.e., a network of DMAs, that is distributive and associative, i.e., it can operate stand-alone or seamlessly within an existing cellular or other network. Moreover, a DMA can be integrated with virtually any third party base station. The DMA can operate with multiple air interfaces including CDMA IS-95, CDMA 1x, CDMA EVDO, GSM, GPRS, W-CDMA, 802.11 (Wi-fi), 802.16 (Wi-fi), etc. Further, the DMA can provide integrated prepaid billing, OAMP, network management, and AAA functionality. The DMA can include a Java based user interface and feature configuration system. Also, the DMA can provide real time call metering, call detail record (CDR) generation, and real time call provisioning. The DMA 406 may be implemented in a relatively small footprint and has a relatively low power requirement. Further, the DMA 406 may be implemented using inexpensive and widely available computer equipment.

With one or more of the deployment configurations described above, the present system provides mobile to landline calls from mobile handsets within a DMA cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA coverage area. IP to IP calls can be made from any DMA handset to any IP phone. Additionally, IP to landline calls and landline to IP calls can be made from a DMA handset to any phone. Further, land-line to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1X or GPRS) service and mobile-to-mobile high speed IP data (1X or GPRS) service. Also, the systems described above can provide IP-PBX capability.

Further, one or more of the illustrated systems can provide IP transport between distributed elements, e.g., DMAs.

Packet back-haul from BTS to RAN can be provided. Further, the control logic within the DMAs can be distributed and associated. Associated systems can be redundant, self-healing, self-organizing, and scalable. Distributed systems can be "snap-together," i.e., a DMA can be linked to a previously deployed DMA in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate stand-alone with a billing system provided by a DMA and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. An apparatus comprising:
a first distributed mobile architecture (DMA) system comprising:
  a processor;
  a computer-readable storage device storing instructions that, when executed by the processor, cause the processor to perform operations comprising:
    receiving registration information associated with a mobile subscriber while the mobile subscriber is located within a coverage area associated with a second DMA system of a DMA network;
    receiving a location update request, wherein the location update request is related to the mobile subscriber and is sent from a third DMA system of the DMA network;
    sending a second location update request to the second DMA system in response to receiving the location update request from the third DMA system;
    receiving a destination internet protocol (IP) address associated with the mobile subscriber from the second DMA system; and
    sending the destination IP address associated with the mobile subscriber to the third DMA system,
    wherein the third DMA system is configured to place a call to the second DMA system via a peer-to-peer IP connection based on a source IP address associated with the third DMA system and the destination IP address associated with the mobile subscriber.

2. The apparatus of claim 1, further comprising a call detail record (CDR) generator to store a set of call detail records.

3. The apparatus of claim 1, further comprising a mobile switching center (MSC) module configured to communicate with one or more networks.

4. The apparatus of claim 3, wherein the one or more networks include an integrated services digital network (ISDN) and a public switched telephone network (PSTN).

5. The apparatus of claim 1, further comprising a base station controller (BSC) module, wherein the BSC module is communicatively coupled to one or more base transceiver stations (BTSs), and wherein the BSC module is configured to route communications to one or more wireless communication networks via the one or more BTSs.

6. The apparatus of claim 1, wherein the computer-readable storage device stores information associated with one or more mobile subscribers that are registered with the first DMA system at a first home location register (HLR).

7. The apparatus of claim 6, wherein the information stored at the first HLR includes at least one of an international mobile subscriber identification (IMSI), an electronic series number (ESN), a mobile directory number (MDN), a location indicator, a global positioning system (GPS) location, a registration indicator, a timer, a mobile switching center (MSC) preference indicator, an integrated services digital network (ISDN) preference indicator, and a voice over Internet protocol (VoIP) preference indicator.

8. The apparatus of claim 1, wherein the computer-readable storage device stores information associated with a first community location register (CLR), wherein the information associated with the first CLR corresponds to information associated with one or more mobile subscribers that are registered with the second DMA system.

9. The apparatus of claim 1, wherein the computer-readable storage device stores information associated with one or more roaming mobile subscribers that are temporarily registered with the first DMA system at a first visitor location register (VLR).

10. A computer readable storage device comprising:
instructions that, when executed by a processor, cause the processor to perform operations comprising:
receiving registration information associated with a mobile subscriber at a first distributed mobile architecture (DMA) system of a DMA network while the mobile subscriber is located within a coverage area associated with a second DMA system of the DMA network;
receiving a location update request at the first DMA system, wherein the location update request is related to the mobile subscriber and is sent from a third DMA system of the DMA network;
sending a second location update request from the first DMA system to the second DMA system in response to receiving the location update request from the third DMA system;
receiving a destination internet protocol (IP) address associated with the mobile subscriber from the second DMA system; and
sending the destination IP address associated with the mobile subscriber to the third DMA system,
wherein the third DMA system is configured to place a call to the second DMA system via a peer-to-peer IP connection based on a source IP address associated with the third DMA system and the destination IP address associated with the mobile subscriber.

11. The computer readable storage device of claim 10, further comprising a first home location register (HLR) storing information associated with one or more mobile subscribers that are registered with the first DMA system.

12. The computer readable storage device of claim 11, wherein the information stored at the first HLR includes at least one of an international mobile subscriber identification (IMSI), an electronic series number (ESN), a mobile directory number (MDN), a location indicator, a global positioning system (GPS) location, a registration indicator, a timer, a mobile switching center (MSC) preference indicator, an integrated services digital network (ISDN) preference indicator, and a voice over Internet protocol (VoIP) preference indicator.

13. The computer readable storage device of claim 10, further comprising a first community location register (CLR) storing information associated with one or more mobile subscribers that are registered with the second DMA system.

14. The computer readable storage device of claim 10, further comprising a first visitor location register (VLR) storing information associated with one or more roaming mobile subscribers that are temporarily registered with the first DMA system.

15. A method comprising:
receiving at a first distributed mobile architecture (DMA) system, a call from a first mobile subscriber to a second mobile subscriber;
determining whether the second mobile subscriber is registered with one of the first DMA system and a second DMA system based on information stored at an authentication, authorization, and accounting (AAA) module, wherein the information stored at the AAA module includes:
a first home location register (HLR) that stores information associated with one or more mobile subscribers that are registered with the first DMA system; and
a first community location register (CLR) storing information associated with a second HLR of the second DMA system, wherein the second HLR stores information associated with one or more mobile subscribers that are registered with the second DMA system, and wherein the second DMA system includes a second CLR; and
initiating connection of the call from the first mobile subscriber to the second mobile subscriber via the first DMA system and the second DMA system when the second mobile subscriber is registered with the second DMA system.

16. The method of claim 15, wherein the call is connected via the first DMA system when the first HLR indicates that the second mobile subscriber is registered with the first DMA system.

17. The method of claim 15, wherein the information that is stored at the first HLR includes at least one of an international mobile subscriber identification (IMSI), an electronic series number (ESN), a mobile directory number (MDN), a location indicator, a global positioning system (GPS) location, a registration indicator, a timer, a mobile switching center (MSC) preference indicator, an integrated services digital network (ISDN) preference indicator, and a voice over Internet protocol (VoIP) preference indicator.

18. The method of claim 15, wherein the AAA module includes a visitor location register (VLR) that stores information associated with one or more roaming mobile subscribers that are temporarily registered with the first DMA system.

19. The method of claim 18, wherein the call is connected via the first DMA system when the VLR indicates that the second mobile subscriber is registered with the first DMA system.

20. The method of claim 18, wherein the information that is stored at the VLR includes at least one of an international mobile subscriber identification (IMSI), an electronic series number (ESN), a temporary location directory number (TLDN), a registration indicator, a timer, a mobile switching center (MSC) preference indicator, an integrated services digital network (ISDN) preference indicator, and a voice over Internet protocol (VoIP) preference indicator.

* * * * *